US012039998B1

(12) United States Patent
Kao et al.

(10) Patent No.: US 12,039,998 B1
(45) Date of Patent: Jul. 16, 2024

(54) SELF-SUPERVISED FEDERATED LEARNING

(71) Applicant: Amazon Technologies, Inc., Seattle, WA (US)

(72) Inventors: Chieh-Chi Kao, Somerville, MA (US); Qingming Tang, Cambridge, MA (US); Ming Sun, Winchester, MA (US); Viktor Rozgic, Belmont, MA (US); Spyridon Matsoukas, Hopkinton, MA (US); Chao Wang, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 17/665,129

(22) Filed: Feb. 4, 2022

(51) Int. Cl.
*G10L 25/78* (2013.01)
*G06N 3/045* (2023.01)
*G06N 3/08* (2023.01)
*G10L 25/21* (2013.01)

(52) U.S. Cl.
CPC .............. *G10L 25/78* (2013.01); *G06N 3/045* (2023.01); *G06N 3/08* (2013.01); *G10L 25/21* (2013.01)

(58) Field of Classification Search
CPC ......... G10L 25/78; G10L 25/21; G06N 3/045; G06N 3/08
See application file for complete search history.

(56) References Cited

U.S. PATENT DOCUMENTS

| 9,786,270 | B2* | 10/2017 | Senior | G10L 15/063 |
|---|---|---|---|---|
| 10,923,111 | B1* | 2/2021 | Fan | G10L 15/16 |
| 2019/0057683 | A1* | 2/2019 | Sak | G10L 15/22 |
| 2020/0117996 | A1* | 4/2020 | Chang | G10L 15/16 |
| 2022/0301573 | A1* | 9/2022 | Wang | G10L 21/028 |

* cited by examiner

*Primary Examiner* — Richemond Dorvil
*Assistant Examiner* — Ethan Daniel Kim
(74) *Attorney, Agent, or Firm* — Pierce Atwood LLP

(57) ABSTRACT

An acoustic event detection system may employ self-supervised federated learning to update encoder and/or classifier machine learning models. In an example operation, an encoder may be pre-trained to extract audio feature data from an audio signal. A decoder may be pre-trained to predict a subsequent portion of audio data (e.g., a subsequent frame of audio data represented by log filterbank energies). The encoder and decoder may be trained using self-supervised learning to improve the decoder's predictions and, by extension, the quality of the audio feature data generated by the encoder. The system may apply federated learning to share encoder updates across user devices. The system may fine-tune the classifier to improve inferences based on the improved audio feature data. The system may distribute classifier updates to the user device(s) to update the on-device classifier.

20 Claims, 16 Drawing Sheets

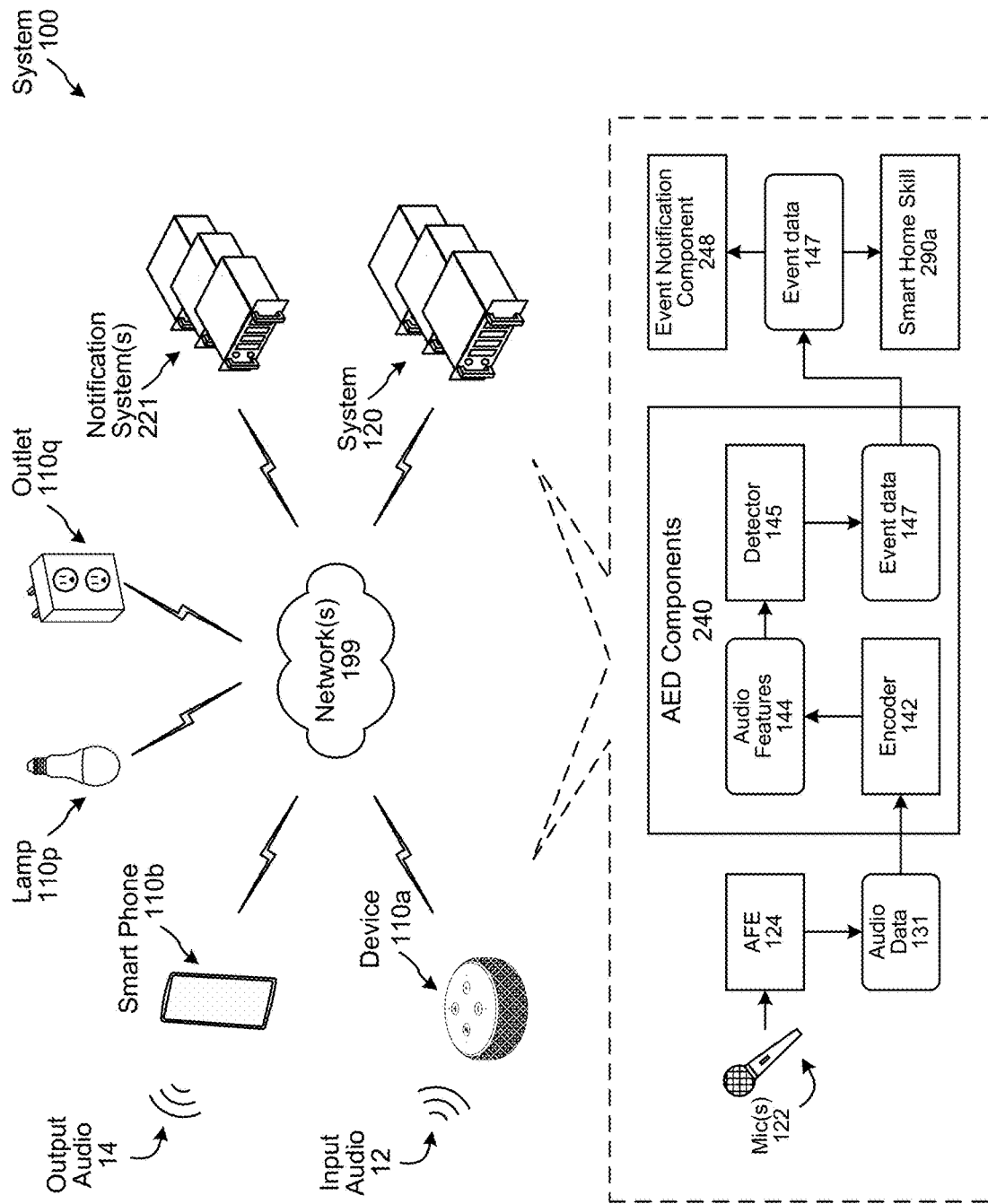

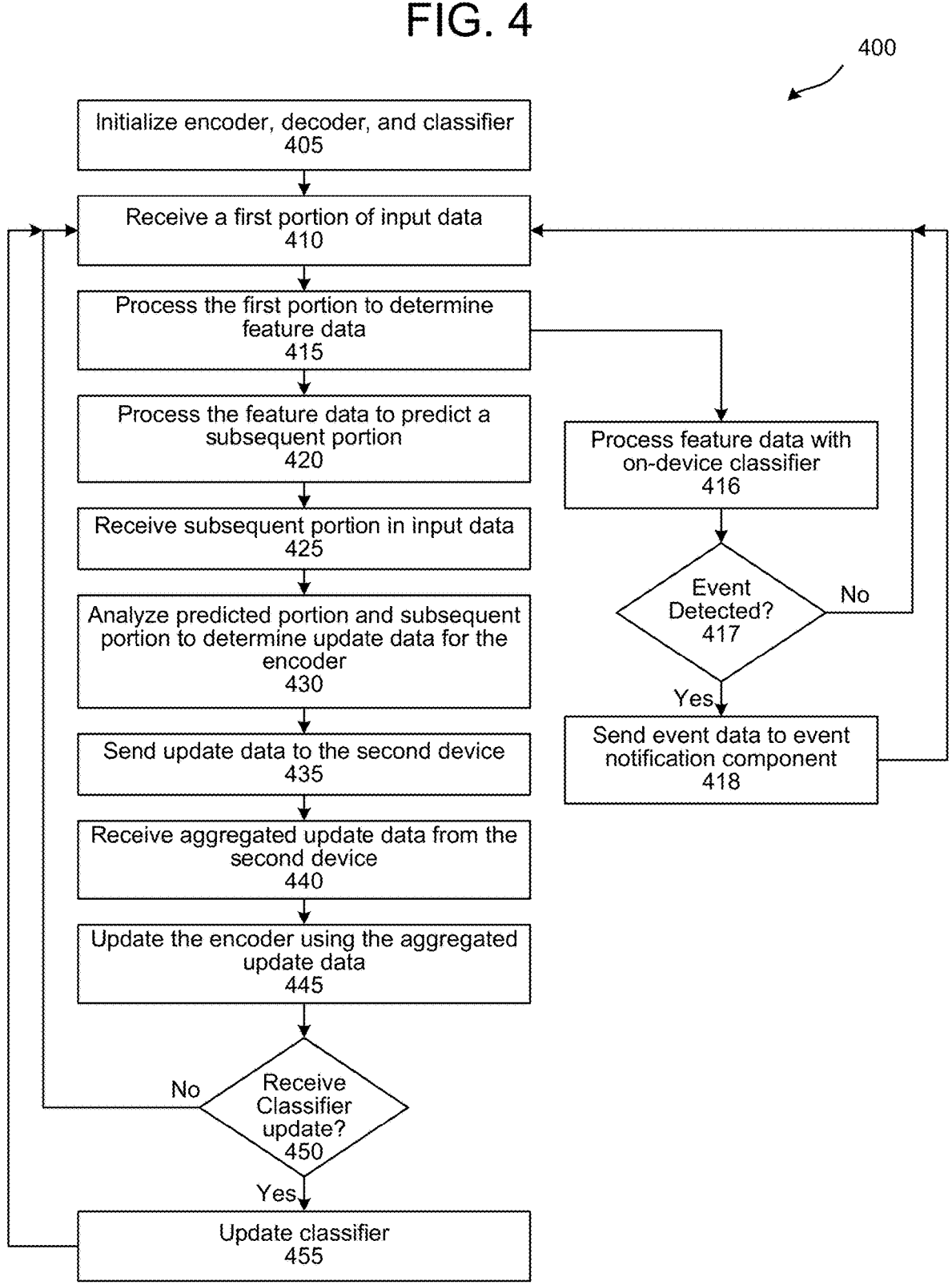

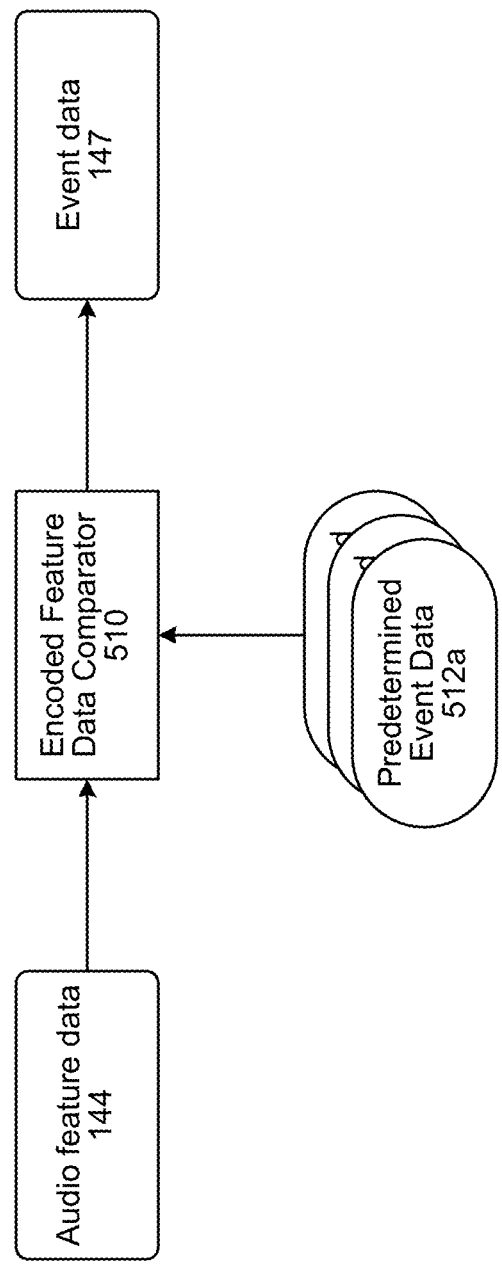

SELF-SUPERVISED FEDERATED LEARNING

BACKGROUND

Computer systems may employ machine learning algorithms to perform tasks that may involve recognizing patterns and/or sequences in data and making inferences and/or predictions. Example applications of machine learning algorithms include acoustic event detection (AED) and/or speech recognition in audio data, object and/or facial recognition in image data, etc.

BRIEF DESCRIPTION OF DRAWINGS

For a more complete understanding of the present disclosure, reference is now made to the following description taken in conjunction with the accompanying drawings.

FIG. 2A is a conceptual diagram illustrating a high-level overview of example components of the system including features configured to detect an acoustic event in a smart home environment, according to embodiments of the present disclosure.

FIG. 4 is flowchart illustrating an example method of using self-supervised federated learning to update a neural network encoder configured to extract audio features from audio data, according to embodiments of the present disclosure.

FIGS. 5A and 5B illustrate example detector components, according to embodiments of the present disclosure.

DETAILED DESCRIPTION

Figure 1A:
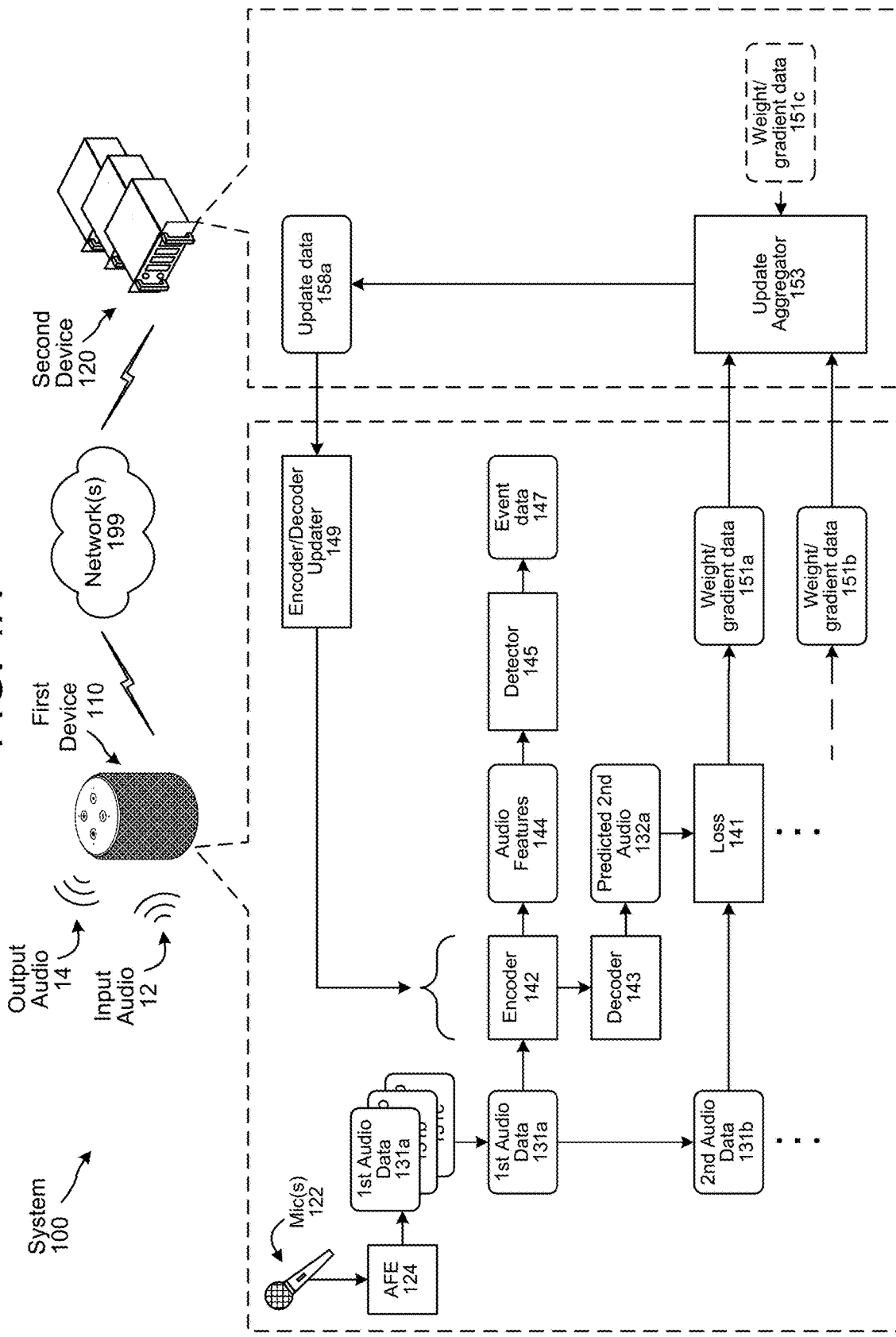
FIGS. 1A and 1B are conceptual diagrams that illustrate using self-supervised federated learning to train models used for acoustic event classification, according to embodiments of the present disclosure.

Acoustic Event Detection (AED), as referred to herein, includes a use of computer science, such as artificial intelligence, that relates to processing audio data representing a sound, such as a non-speech sound, to determine when and if a particular acoustic event is represented in the audio data. An AED system may be used as part of a smart home system or an alarm system that may detect and possibly take one or more actions in response to detecting an acoustic event. An AED system may be configured to detect and act upon different types of acoustic events. An acoustic event may be an event identified in the presence of an acoustic background (e.g., background noise) represented in audio data; for example, and without limitation, a door opening, a doorbell ringing, breaking glass, footsteps, a baby crying, a smoke alarm, etc. Such acoustic events may be distinguished from uneventful background noise such as wind, traffic, HVAC equipment, etc. The AED system may respond to a detected event by turning on a light, adjusting environmental settings, triggering an alarm, sending a notification to a user, recording video using a camera, etc.

A device (alone or in conjunction with a second device such as a remote device/system) may be configured to process audio data to determine if properties of the audio data correspond to properties associated with an acoustic event. The device may capture audio using one or more microphones, and generate corresponding audio data. The audio data may include groups of samples, where a frame of audio data is used to represent a corresponding sample for a period of time. The audio data may represent raw audio signals (e.g., a time-domain waveform) and/or a spectrogram (e.g., frequency domain information such as log filterbank energies (LFBE)). An audio feature encoder may process the audio data to extract audio features. A classifier component may then process the audio features to determine whether the audio features indicate one or more acoustic events.

An audio feature encoder may be configured to process the audio data to extract the audio features. The classifier component may be configured to determine whether the audio features indicate a potential representation of one or more acoustic events. The encoder and/or classifier may include machine learning models (e.g., neural networks), which may be trained based on audio data received by the device. To enhance privacy protections and reduce the costs of transferring large amounts of data from the device, it may be beneficial to perform training of machine learning models on the device (if a device is capable of such training), and propagate update information (e.g., gradients and/or parameter data) to a second device such as a central device or system of devices using a federated learning technique whereby update information is aggregated from other devices and/or systems, and model updates are distributed back to the other device(s)/system(s). Furthermore, due to the audio data lacking annotations, such as labels, that would facilitate supervised learning, the device may use a self-supervised learning technique to train the encoder to produce improved audio feature data.

Offered are systems and methods for, among other things, performing self-supervised federated learning for updating encoder and/or classifier machine learning models used for acoustic event detection and/or classification. In an example operation, an encoder may be trained to extract audio features from an audio signal. A decoder may be trained to predict a subsequent portion of audio data (e.g., a subsequent frame of audio data represented by LFBE). The encoder and decoder may be trained using self-supervised learning to improve the decoder's predictions and, by extension, the quality of the audio feature data generated by the encoder. The system may apply federated learning to share encoder updates across devices. The system may fine-tune the classifier to improve inferences based on the improved audio feature data. The system may distribute classifier updates to the device(s) to update an on-device classifier.

Although illustrated for updating an encoder in the context of acoustic event detection, the systems and methods described herein can be applied to encoders or other neural network components configured to extract features from various types of sequential data.

Figure 1B:
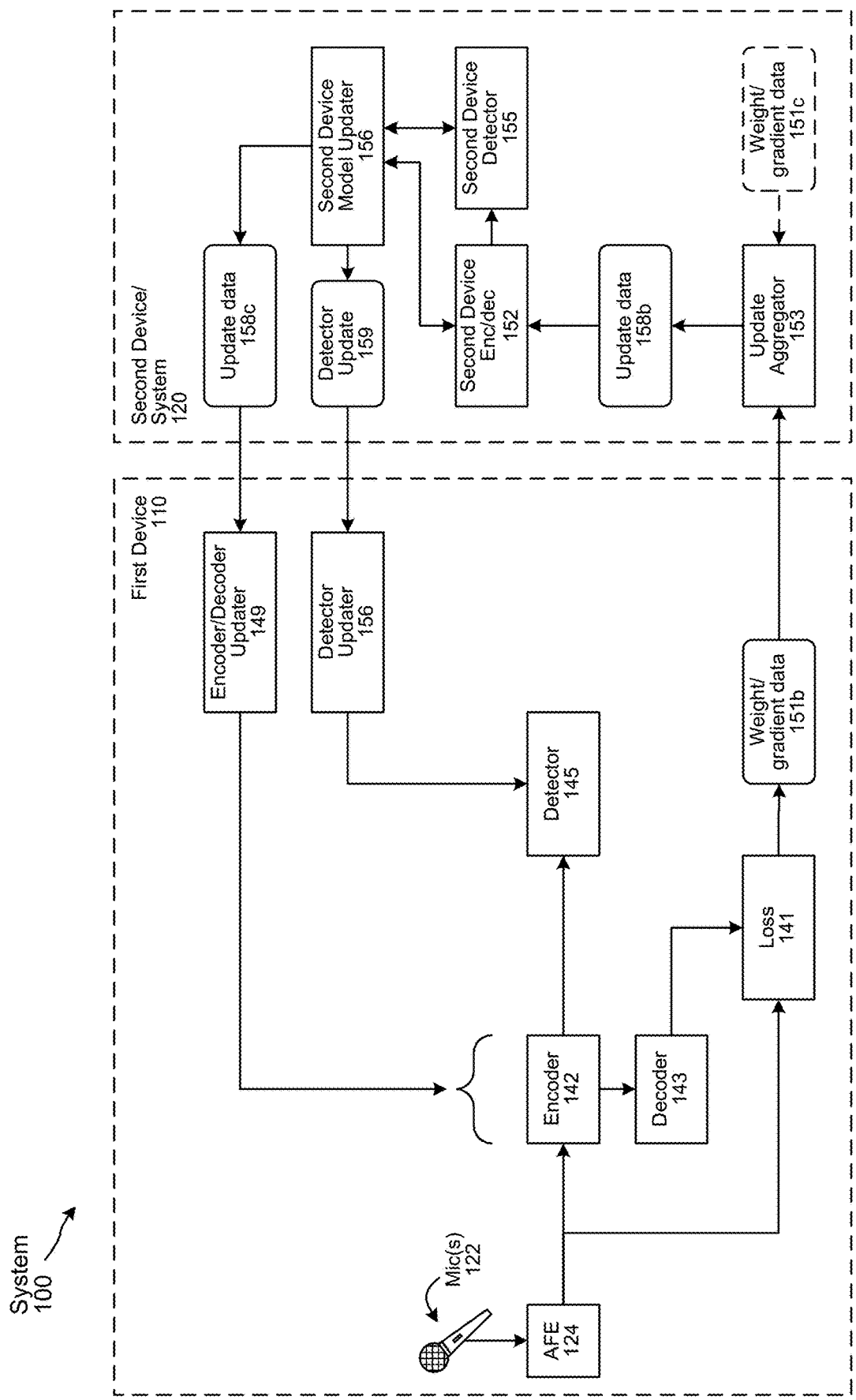

FIGS. 1A and 1B are conceptual diagrams illustrating example operations for using self-supervised federated learning to train models used for acoustic event classification, according to embodiments of the present disclosure. The operations may be performed by a system 100, which may include at least a first device 110, such as one of the user devices 110 described with reference to FIG. 13, and a second device/system 120. The first device 110 and second device/system 120 may communicate over one or more computer networks 199. The systems 120 may in close proximity to the device 110 (e.g., in the same room, building, complex, etc.) or may be remote from the device 110 (e.g., in a datacenter and/or otherwise implemented "in the cloud"). In some implementations, the device 110 and/or second device/system 120 may additionally communicate with one or more notification systems 221 and/or skill support systems 225, which may provide additional capabilities to the system 100, as described with reference to FIGS. 2A and 2B. The device 110, system 120, notification system 221, and/or skill support systems 225 may include similar or different hardware and/or software. Various examples of devices/system features are described in additional detail below with reference to FIGS. 11 to 13.

The system 100 may include components for performing audio event detection (AED) and/or generating notifications to a user. An audio capture component(s), such as a microphone or array of microphones 122 of the device 110, may capture input audio 12 and create a corresponding audio signal. An acoustic front end (AFE) 124 may process the audio signal using a number of techniques, such as determining frequency-domain audio data by using a transform such as an FFT and/or determining a Mel-cepstrum. The AFE 124 may output audio data 131, which may be or include acoustic feature data corresponding to a representation of the input audio 12. The AFE 124 may process the audio signal to create acoustic feature data, which may include one or more acoustic-feature vectors such as LFBE vectors. Other types of feature vectors may be similarly created and used; for example, the feature vectors may include Mel-frequency cepstrum coefficients (MFCCs).

The AFE 124 may include an analysis filterbank that processes one or more frames audio data (and/or other sequential input data). The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges, wherein M may equal 20.

An energy estimation component may receive as input the frequency data, process it to determine one or more values that represent an estimated energy of the frequency data, and output corresponding acoustic feature data for each audio frame. If M acoustic features are extracted, the acoustic feature data may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filterbank energies (LFBEs) of each bin. The acoustic feature data may thus include one or more LFBE vectors. In other embodiments, the energy estimation component may perform a linear cosine transform on the logarithm of the frequency data to determine Mel-frequency cepstrum coefficients (MFCC), which may instead or in addition be represented by the acoustic feature data. The dimension of each acoustic feature vector of the acoustic feature data (which may be 20) may correspond to the number M of frequency bins (which may be 20).

The first device 110 may include one or more components for detecting and/or classifying acoustic events. The acoustic event detection components may include an encoder 142, a decoder 143, and a detector 145. The encoder 142, decoder 143, and detector 145 may be referred to collectively as AED components, such as the AED components 240 illustrated in FIGS. 2A and 2B. The AED components may receive the audio data 131 from the AFE 124. This audio data may be a digital representation of an analog audio signal and may be sampled at, for example, 256 kHz. The AED components 240 may instead or in addition receive acoustic feature data, which may include one or more LFBE and/or MFCC vectors, from the acoustic front end 124 as described above. The audio data 131 may include frames, where each frame may represent audio data or audio features for segment of audio data; for example, 30 ms. The AED components 240 may process the audio data 131 in blocks; for example, where a block represents 1s, 3s, 5s, 10s, or some other duration of audio. The audio data 131 may be processed in portions such as a first portion 131$a$, a second portion 131$b$, etc. Each portion of the audio data 131 may correspond to one or more frames.

The encoder 142 may be configured to process portions of the audio data 131 and generate audio feature data 144. The encoder 142 may include a machine learning component or model such as a neural network, random forest, linear regression, logistic regression, decision trees, Naïve Bayes, etc. The encoder 142 may send the audio feature data 144 to the decoder 143. The decoder 143 may be configured to process the audio feature data 144 to predict a subsequent portion of the audio data (e.g., the LFBE of a subsequent frame of audio data), and generate predicted audio data 132.

The encoder 142 may additionally send the audio feature data 144 to the detector 145. The detector component 145 may include any type of logic and/or software configured to detect a potential presence of an event represented in the audio feature data 144. The detector 145 may include a machine learning component such as a neural network (or other machine learning model/algorithm) classifier pretrained to detect and/or classify acoustic events represented in the audio feature data 144. The detector 145 may be trained (e.g., by adjusting weights of a neural network based on a training dataset) to recognize the potential presence of one or more acoustic events as represented in the audio feature data 144. Additionally or alternatively, the detector 145 may analyze the audio feature data 144 with respect to stored data to determine event data 147. The stored data may represent audio (e.g., signatures of sounds identifiable in audio feature data) of one or more events. The signatures/events may include system-supplied events as well as user-uploaded events, allowing users to create custom actions in response to custom events. The detector component 145 may determine, based at least in part on the audio feature data 144 and stored data, that an instance of one or more events has occurred. Example detectors 145 and/or 155 are described in additional detail below with reference to FIGS. 5A and 5B. The audio feature data 144 may be processed by a detector component 145.

In some implementations, the first device 110 may send the audio feature data 144 to the second device/system 120. The second device/system 120 may include a second device detector 155 (e.g., as shown in FIG. 1B), which may perform separate/alternative processing of the audio feature data 144 to determine event data 147. The system 100 may respond to the event data 147 and/or event data 147 as described below with reference to FIG. 2A.

The system 100 may include features for updating the various models on the first device 110 and second device/system 120. FIG. 1A illustrates an example of updating encoders 142 and/or decoders 143 on the first device 110, and FIG. 1B illustrates an example of updating encoders/decoders 152 and/or detectors 155 on the second device/system 120. As described further below, a component 141 may calculate loss between predicted audio data and subsequently received audio data. The component 141 may further calculate gradient and/or weight data 151, which the first device 110 may use to update weights of the encoder 142 and/or decoder 143. The first device 110 may send the weight/gradient data 151 to the second device/system 120, which may aggregate weight/gradient data 151 from the first device 110 and/or additional devices using an update aggregator 153. The update aggregator 153 may generate encoder/decoder update data 158, which the second device/system 120 may send to the first device 110. The first device 110 may receive the encoder/decoder update data 158, and use it to update weights of the encoder 142 and decoder 143.

FIG. 1A illustrates example operations of the system 100 processing input audio 12, updating first device 110 models based on self-supervised learning, and further updating first device 110 models based on federated learning using update data from the first device 110 as well as other devices. The system 100 may start with a first version encoder 142 and a first version decoder 143, and update one or both to a second version encoder 142 and/or a second version decoder 143 (e.g., as shown in FIG. 1B. Given audio data 131 consisting of: $x=(x_1, x_2, \ldots x_N)$, where N is a length of a block of audio data (e.g., 10 seconds of audio data divided into N frames), the encoder 142, decoder 143, and detector may be pre-trained to make binary predictions $z \in \{0, 1\}$ on whether a certain event is represented in audio data x. The models (e.g., the encoder 142, decoder 143, and/or detector 145) may be pre-trained using an annotated dataset $D_{server}=\{(x, z)\}$. As the first device 110 processes input data, it may generate an unlabeled dataset $D_{client}=\{x\}$. $D_{client}$ may be stored in the first device 110 such that user audio data does not leave the first device 110. The first device 110 may be one of K client devices $S=(S_1, S_2, \ldots S_K)$ for the purposes of applying federated learning techniques to device 110 model updates.

The system 100 may use $D_{server}$ to pre-train the models including weights $w_{enc}$ of the encoder ($g_{enc}: x \to h$, $x \in \mathbb{R}^n$, $h \in \mathbb{R}^m$) and weights $W$ dec the decoder ($g_{dec}: h \to x$, $h \in \mathbb{R}^m$, $x \in \mathbb{R}^n$) where n represents a dimension of the audio data (e.g., log filterbank energies), and m represents a dimension of a feature vector of the audio feature data determined by the encoder 142. The encoder 142 may process a first portion of the audio data 131a ($x_1$) to generate audio feature data 144 ($h_1$). The decoder 143 may process the audio feature data 144 to generate predicted second audio data 132a representing an expected subsequent portion of the audio data (e.g., a predicted $x_{i+n}$, where n represents a number of steps the prediction is ahead of $x_i$). The component 141 may calculate a loss (e.g., an L1 loss) between the predicted $x_{i+n}$ and the actual $x_{i+n}$. The system 100 may optimize the reconstructed loss between a predicted sequence $y=(y_1, y_2, \ldots y_N)$ and the target sequence $t=(x_{1+n}, x_{2+n}, \ldots x_{N+n})$.

The system 100 may deploy the model weights $w_{enc}$ and $w_{dec}$ to the first device 110. The first device 110 may generate the encoder 142 using $w_{enc}$, and the decoder 143 using $w_{dec}$. The first device 110 may process data $D_{client}$ representing audio data received (or generated) by the first device 110. $D_{client}$ may include a first portion of audio data 131a, which the encoder 142 may process to determine audio feature data 144. The first device detector 145 may process the audio feature data 144 to determine event data 147. The decoder 143 may also process the audio feature data 144 to determine predicted second audio data 132a. The component 141 may analyze the predicted second audio data 132a with respect to a second portion of audio data 131b to determine a loss between the respective data and calculate gradients and/or adjusted weight data 151a for the encoder and/or decoder. The system 100 may repeat this process several or many times (e.g., by comparing predicted third audio data 132b with subsequently received third audio data 131c to generate additional weight/gradient data 151b, and so on). The system 100 may also continue processing subsequent audio feature data 144 using the detector 145 to generate the event data 147 and/or additional event data 147.

In some cases, an encoder/decoder updater 149 of the first device 110 may use the adjusted weight data 151a to update the encoder 142 and/or the decoder 143. The first device 110 may process the subsequent portions of the audio data 131 (e.g., third audio data 131c) using the updated encoder 142 to determine subsequent audio feature data 144.

In some cases, the first device 110 may send weight and/or gradient data 151a and 151b (collectively "weight and/or gradient data 151") to the second device 120. An update aggregator 153 may aggregate the updates (e.g., from the first device 110 as well as additional weight/gradient data 151c from other devices 110) to generate update data 158a. The second device 120 may distribute the update data 158a to the first device 110 and other devices. The first device 110 may receive the update data 158a. The encoder/decoder updater 149 of the first device 110 may update encoder and/or decoder weights to generate the updated encoder 142 and/or decoder 143.

Applying the federated learning framework, the loss function can be written as in the equations below, where $n_k=|D_k|$ and $n=\Sigma_{k=1}^{K} n_k$.

$$\min_{w_{enc}, w_{dec}} L(w_{enc}, w_{dec})$$

$$L(w_{enc}, w_{dec}) = \sum_{k=1}^{K} \frac{n_k}{n} l(w_{enc}, w_{dec})$$

$$l_{w_{enc}, w_{dec}} = \sum_{i=1}^{N-n} |x_{i+n} - y_i|$$

Once the models converge, the determine weights $w_{t+1}$ may be distributed to the device 110 via the update data 158a, and used to generate the updated encoder 142 and/or decoder 143. The system 100 may update the encoder 142 and/or decoder 143 one, several, or many times as iterations of federated learning progress Further AED performance gains may be achieved by retraining the detector 145 to process audio feature data generated by the updated encoder 142. FIG. 1B illustrates example operations of the system 100 retraining the detector 145. The second device 120 may include a second device model updater 156, which may update second device models such as a second device encoder/decoder 152 and a second device detector 155. The second device encoder/decoder 152 may represent a current version of the encoder 142 and/or decoder 143 (e.g., based on the latest update). The second device model updater 156 may use the original annotated dataset $D_{server}$ to retrain the second device encoder/decoder 152 and/or the second device detector 155. The results of the retraining may include detector update data 159 and/or encoder/decoder update data 158c. The second device 120 may send the detector update data 159 and/or encoder/decoder update data 158c to the first device 110 for updating the first device models. The detector 145 update process may proceed as follows.

The update aggregator 153 may aggregate the weight/gradient data 151b (as well as weight/gradient data 151c received from other devices 110) to generate the update data 158b. The update data 158b may include weights for updating the second device encoder/decoder 152. The second device model updater 156 may retrain the detector 155 to generate an updated detector 155. The second device model updater 156 may process the original annotated dataset (e.g., which may be the same dataset D server used to train the initial models of the system 100) using the second device encoder/decoder 152 and the detector 155. In some implementations, the second device model updater 156 may keep the weights of the second device encoder/decoder 152 at constant values during training, and only update the weight values of the detector 155. In some implementations, the system 100 may use the most recent encoder 142 and/or decoder 143 weights as initial weights for the second device encoder/decoder 152 when initializing the training, and update the weights during the training. Thus, the updated detector 155 may be optimized to process audio feature data 144 generated by most recent versions of the encoder 142 and decoder 143. The second device model updater 156 may send the detector updates to the first device 110, where a device updater 156 may update weights of the first version detector 145 to generate a second version detector 145. If the weights of the second device encoder/decoder 152 are updated during training, the updated weights may be sent to the first device 110 as an update to the encoder 142 and/or decoder 143 (e.g., as the update data 158c) along with updated weights for the detector 145 (e.g., the detector update data 159). The encoder/decoder updater 149 of the first device 110 may update weights of the encoder 142 and/or the decoder 143 using the update data 158c. The detector updater 156 may update weights of the detector 145 using the detector update data 159.

The detector 145 may include a classifier ($g_c$:h→p, h∈ $\mathbb{R}^m$, p∈$\mathbb{R}$ ) that may as input the output of the encoder—that is, the audio feature data—and may output the binary predictions z∈{0,1}. The weights of second device encoder/decoder ($w_{t+1}$) may be used as initializing weights for the training, or held constant during training of the classifier. In some implementations, the classifier may be trained using a modified binary cross-entropy loss as shown in the equation below:

$$l_c = -[c \cdot z_n \cdot \ln p_n + (1-z_n) \ln(1-p_n)]$$

where c may be a positive scaling factor to adjust the loss for positive samples. This technique may be extended to multi-class classification problems by adding a binary classifier for each new class of event following a one-vs.-all paradigm.

Thus, the self-supervised federated learning techniques may be applied in three stages for K clients indexed by k, where B is the local minibatch size, E is the number of local training epochs, and η is the learning rate.

State I may include pre-training model weights wo using the $D_{server}$ dataset, and distributing the weights to the devices 110.

Stage II may include federated self-supervised learning for T rounds t=1, 2, . . . (e.g., as illustrated in FIG. 1A). In each round, update a random set of m clients→$S_t$. For each client k∈$S_t$, perform a ClientUpdate(k,$w_t$)→$w_{t+1}^k$. Stage II may continue until all clients have been updated:

$$w_{t+1} = \sum_{k=1}^{K} \frac{n_k}{n} w_{t+1}^k.$$

Stage III may include training the classifier based on the latest encoder/decoder updates using the $D_{server}$ dataset; that is, the encoder weights $w_{enc}$ may be fixed (e.g., as illustrated in FIG. 1B). For B in $D_{server}$, the encoder may determine h←$g_{enc}$(B), the classifier may determine p'←$g_c$(h), and new classifier weights may be determined: $w_c$←$w_c$−n∇l(w; b). Finally, the classifier update may be sent to the clients. The first device 110 may receive the classifier update, and a detector updater 156 of the first device 110 may update the first device detector 145. The encoder updater 149 may update the encoder 142 and/or decoder 143 using the latest update data 158—that is, update data 158 reflecting encoder weights used when training the classifier—to generate an updated encoder 142 and/or decoder 143. The operations illustrated in FIGS. 1A and 1B may be repeated as the first device 110 (and other devices 110) process additional $D_{client}$ and further refine their models. In some implementations, classifier updates may follow several encoder/decoder updates. For example, the system 100 may deploy version 1.0 models, with each encoder/decoder update incrementing the decimal with successive versions 1.1, 1.2, 1.3, etc. The system 100 may deploy version 2.0 models including a classifier update to accompany the latest encoder/decoder update. The system 100 may continue to deploy updated encoder/decoder models using the same classifier through successive versions 2.1, 2.2, 2.3, etc., and so on.

FIG. 2A is a conceptual diagram illustrating a high level overview of example components of the system 100 including features configured to detect an acoustic event in a smart home environment, according to embodiments of the present disclosure. Such acoustic events relevant to a smart home environment system (e.g., an alarm system) may include, for example, and without limitation, a door opening, a doorbell ringing, breaking glass, footsteps, a baby crying, a smoke alarm, etc. The system 100 may distinguish the acoustic events from uneventful background noise such as wind, traffic, HVAC equipment, etc. The system 100 may respond to a detected event by turning on a light, adjusting environmental settings, triggering an alarm, sending a notification to a user, recording video using a camera, etc.

The system 100 may include the first device 110, the second device or system 120, and/or one or more notification system(s) 221. The system 100 may additionally include one or many additional devices 110 with smart home functionality, such as a lamp 110p and a power outlet 110q. The system 100 may include an additional user device, such as the smart phone 110b, to which the system 100 may send notifications and/or from which the system 100 may receive commands; for example, to change a physical state or, or otherwise operate, the lamp 110p, the outlet 110q, and/or other smart home devices.

The system 100 may include various components as illustrated in FIGS. 2A (and/or 2B). The system 100 may include (e.g., in the devices 110a and/or the system 120) the AFE 124, AED components 240, an event notification component 248, and/or one or more skill components 290. The components may reside in the device 110 and/or second device/system 120 such that various functionality described herein may be performed by the device 110, the second device 120, or may be divided or shared between the two. For example, in some cases, the device 110 may process audio data locally, whereas in other cases the device 110 may send audio data to the system 120 for processing.

The AED components 240 may include an encoder 142 and detector 145 as previously described. The AED components 240 may process the audio data 131 and generate event data 147 regarding detected events such as glass breaking, a door opening or closing, etc. The event notification component 248 may, in response to receiving the event data 147, send notifications (e.g., to the smart phone 110b). For example, the event notification component 248 may generate and/or cause the system 100 to output a notification to a user in response to the detected event represented in the event data 147; for example, to alert the user that the device 110 has detected an alarm. The event notification component 248 may work in conjunction with one or more notification system(s) 221. In some implementations, the event notification component 248 may be a component of a notification system 221. Although illustrated as a separate system, notification system(s) 221 may be configured within system(s) 120, device 110, or otherwise depending on system configuration. For example, event notification component 248 may be configured within the second device/system(s) 120, device 110, or otherwise. The event notification component 248 may handle sending notifications/commands to other devices upon the occurrence of a detected acoustic event. The event notification component 248 may have access to information/instructions (for example as associated with profile storage 270 or otherwise) that indicate what device(s) are to be notified upon detection of an acoustic event, the preferences associated with those notifications or other information. The event notification component 248 may have access to information/instructions (for example as associated with profile storage 270 or otherwise) that indicate what device(s) are to perform what actions in response to detection of an acoustic event (for example locking a door, turning on/off lights, notifying emergency services, or the like. Further detail regarding the event notification component may be found below with regard to FIG. 6.

Certain capabilities of the system 100 may be performed by "skills," whose functions may be performed by a skill component 290. A skill component 290 may be software running on or in conjunction with the system 100 that is, or is similar to, a software application. A skill component 290 may enable the system 100 to execute specific functionality in order to provide data or produce some other requested output. One example of a skill component 290 is a smart home skill component 290a, which may be configured to send commands to operate smart home devices and/or receive status or diagnostic information from the smart home devices. Some skill components 290 may operate in cooperation with a skill support system 225, which may be separate and/or distinct from the first device 110 and/or second device/system 120. Some skill components 290 may reside on the device 110 (e.g., "device skills") while other skill components 290 may reside on the system 120. Performing certain processing and actions on the device 110 (e.g., without sending audio data off device) may increase privacy and/or security of the user's data.

In an example operation, the system 100 may receive input audio 12, and generate audio data 131 using the AFE 124. The AED components 240 may process the audio data 131 to generate audio feature data 144 and/or event data 147 representing features of the audio data 131 and/or a detected acoustic event. An acoustic event may be an event identified in the presence of an acoustic background. The system 100 may send the event data 147 to an event notification component 248 configured to generate and issue notifications upon detection of certain acoustic events. The system 100 may send the event data 147 to a smart home skill component 290a, which may be configured to operate smart home devices based on preset rules and/or learned behaviors.

The smart home skill component 290a may receive event data 147 from the AED components 240 and perform configured and/or learned behaviors, such as changing a physical state of a smart home device. For example, the smart home skill component 290a may be configured to turn on the lamp 110p upon detecting the opening of a door leading to the room containing the lamp 110p. The smart home skill component 290a may be configured to turn on outdoor lighting based on a disturbance acoustically detected in a yard, and/or activate a security camera or increase a frame rate of the security camera to capture a source of the disturbance. In concert, the event notification component 248 may send a notification to the smart phone 110b regarding the detected disturbance. The smart phone 110b may issue a push notification, which may be accompanied by output audio 14 such as an alert tone, to alert the user to the disturbance.

Similarly, the smart home skill component 290a may control electricity delivery from the outlet 110q based on preset rules and/or learned behaviors. For example, the smart home skill component 290a may determine to cut power from the outlet 110q in response to a sudden surge in current possibly indicating failure of an appliance. Additionally/alternatively, a user may configure the smart home skill component 290a to turn on the outlet 110q based on detection if an infant crying, so as to activate a music player, white noise generator, light projector, etc., for soothing the baby. The smart home skill component 290a may be configured with additional functionality, such as locking/unlocking a pet door in response to a particular dog's bark. The smart home skill component 290a may operate additional automated smart home devices such as autonomous or semi-autonomous appliances such as a vacuum cleaner or drone with a camera. For example, the smart home skill component 290a may direct such a robot or appliance to a room where an event has been detected (e.g., to vacuum broken glass or obtain video of a disturbance). The smart home skill component 290a may additionally be configured to receive NLU output data (e.g., ranked output data 925 from the NLU component 260, as described further below) from a speech processing system and operate, configure, and/or diagnose one or more smart home devices according to user.

The system 100 may be, for example, a speech-processing system with the device 110 acting as a voice-controlled device. A speech-processing system may combine various technologies to perform actions for and/or on behalf of a user. For example, automatic speech recognition (ASR) includes transforming audio data representing speech into text or other type of data representing the words (in one or more human-understandable languages) in that speech. Natural language understanding (NLU) includes enabling computers to derive meaning from the words, such as those typed by a user and/or represented in ASR's output data. Natural language generation (NLG) includes enabling computers to generate output text or other data in words a human can understand, such as sentences or phrases. Text-to-speech (TTS) is a field of computer science, artificial intelligence, and linguistics that relates to enabling computers to convert a representation of NLG output data, user provided data, or other data into audio representing synthesized speech. Neural machine translation (NMT) includes enabling computers to receive an input in one language (e.g., as text in English) and generate an output in a second language (text in Spanish), which has the same/similar semantic meaning as the input. These technologies and others may be used together as part of a natural-understanding system.

Figure 2B:
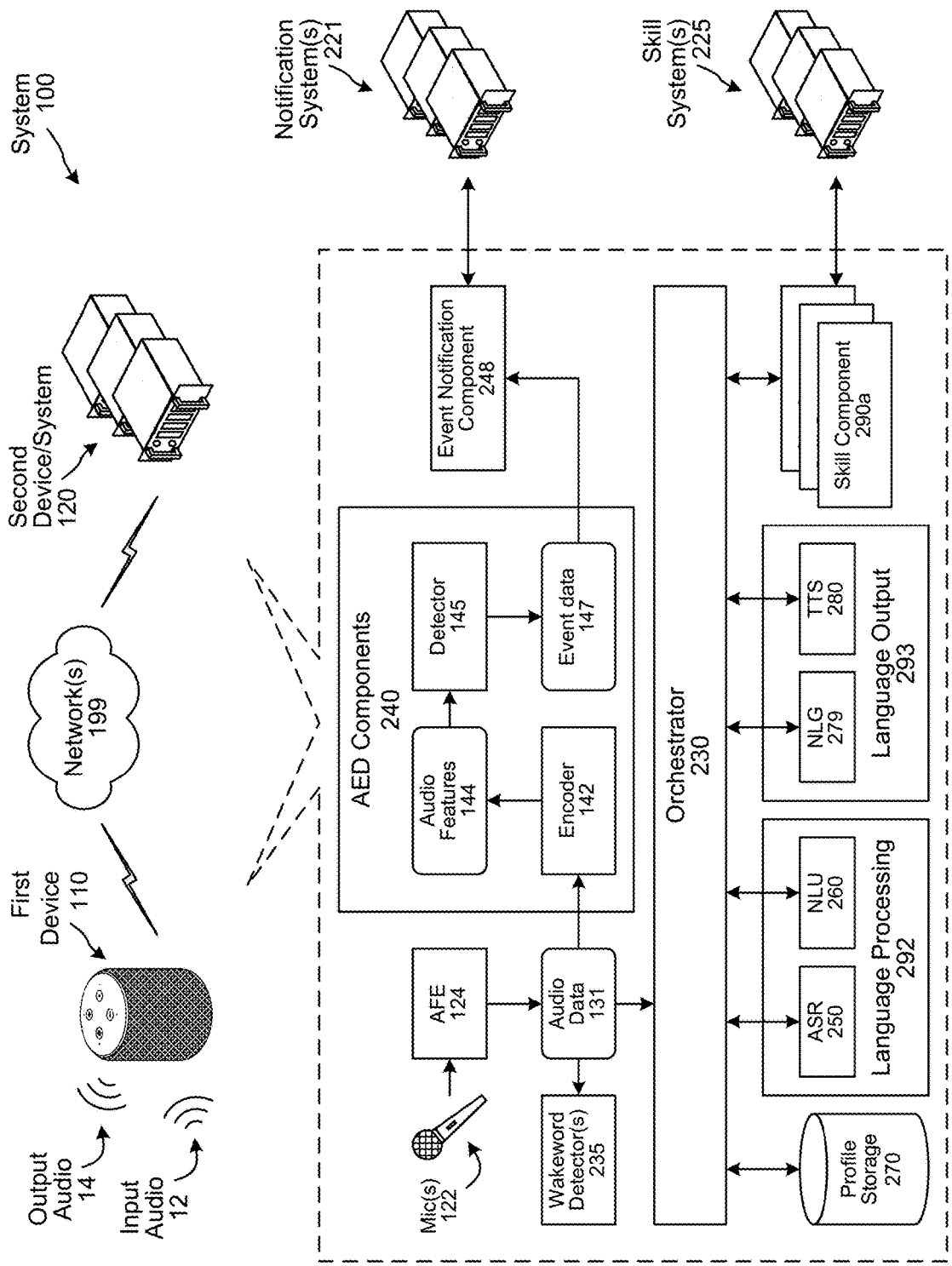
FIG. 2B is a conceptual diagram illustrating a high-level overview of example components of the system including features for processing natural language commands, according to embodiments of the present disclosure.

FIG. 2B is a conceptual diagram illustrating a high level overview of example components of the system 100 including features for processing natural language commands, according to embodiments of the present disclosure. In addition to the components previously described in the context of acoustic event detection, the system 100 may include components for performing speech processing and synthesis, as well as for responding to natural language commands. The system 100 may include a wakeword detector 235, an orchestrator component 230, a profile storage 270, language processing components 292 including an ASR component 250 and an NLU component 260, language output components 293 including an NLG component 279 and a TTS component 280, and/or one or more skill components 290a, 290b, 290c, etc. (collectively "skill components 290"), which may be in communication with one or more skill support systems 225. The system 100 may provide output to a user in the form of synthesized speech, notification sounds, or other output audio 14.

The components may reside in the device 110 and/or second device/system 120 such that various functionality described herein may be performed by the device 110, the second device 120, or may be divided or shared between the two. For example, in some cases, the device 110 may process audio data locally, whereas in other cases the device 110 may send audio data to the system 120 for processing. In some implementations, the first device 110 may perform initial processing of audio and/or other input data, and send a form of intermittent data to the second device/system 120. The intermittent data may include ASR data (such that audio data including a user's voice need not be sent from the user's device 110), update data pertaining to various models used by the first device 110, and/or commands to skill components 290, etc.

In some implementations, the system 100 may include multiple AFEs 124. For example, the AFE 124 providing audio data 131 to the AED components 240 may differ from the AFE 124 providing audio data to the wakeword detector 235. This may be due to the AED components 240 having a different context window from the wakeword detector 235. For example, the wakeword acoustic-feature data may correspond to three seconds of audio data, while the AED acoustic-feature data may correspond to ten seconds of audio data.

The system 100 may process the audio data 131 to determine whether speech is represented therein. The system 100 may use various techniques to determine whether the input audio data 131 includes speech. In some examples, a voice-activity detector may apply voice-activity detection (VAD) techniques. Such VAD techniques may determine whether speech is present in audio data 131 based on various quantitative aspects of the input audio data 131, such as the spectral slope between one or more frames of the audio data; the energy levels of the audio data in one or more spectral bands; the signal-to-noise ratios of the audio data in one or more spectral bands; or other quantitative or qualitative aspects. In other examples, the system 100 may include a classifier configured to distinguish speech from background noise. The classifier may be implemented by techniques such as linear classifiers, support vector machines, and decision trees. In still other examples, the system 100 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 235 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 235 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the wakeword detector(s) 235 may use one of a plurality of wakeword-detection models. Each model may be trained to detect a different wakeword. In some embodiments, a single model may detect multiple wakewords. Each wakeword may be associated with a different speech-processing system and/or different speech-processing system configurations (e.g., representing different virtual assistants available to the user via the system 100). Upon detection of a particular wakeword, the system 100 may process the audio data 131 by the corresponding speech-processing system configuration.

In various embodiments, the wakeword-detection model of the wakeword detector(s) 235 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 235 may determine a similarity score for the candidate wakeword based on how similar it is to the stored wakeword; if the similarly score is higher than the wakeword-detection threshold, the wakeword detector 235 may determine that the wakeword is present in the audio data, and if the similarity score is less than the wakeword-detection threshold, the wakeword detector 235 may determine that the wakeword not is present in the audio data. For example, if the candidate wakeword matches the stored wakeword very closely, the wakeword detector 235 may determine a similarity score of 100; if the candidate wakeword does not match the stored wakeword at all, the wakeword detector 235 may determine a similarity score of 0. If the wakeword detector 235 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Once a wakeword is detected by the wakeword detector(s) 235, the system 100 may begin processing speech represented in the audio data 131. The system 100 may send the audio data 131 to an orchestrator component 230. The orchestrator component 230 may include memory and logic that enables it to transmit various pieces and forms of data to various components of the system, as well as perform other operations as described herein. The orchestrator component 230 may be or include a speech-processing system manager, which may be used to determine which, if any, of the language processing components 292, language output components 293, and/or skill components 290 should receive and/or process the audio data 131 and/or data derived therefrom (e.g., by ASR, NLU, and/or entity resolution).

In some embodiments, the orchestrator component 230 and/or speech-processing system manager communicate with the language processing components 292 using an application programming interface (API). The API may be used to send and/or receive data, commands, or other information to and/or from the language processing components 292. For example, the orchestrator component 230 may send, via the API, the input audio data 131 to language processing components 292 elected by the speech-processing system manager and may receive, from the selected language processing components 292, a command and/or data responsive to the audio data 131.

The language processing components 292 may include an ASR component 250, which may transcribe the input audio data 131 into text data. The text data output by the ASR component 250 may represent one or more than one (e.g., in the form of an N-best list) ASR hypotheses representing speech represented in the input audio data 131. The ASR component 250 may interpret the speech in the input audio data 131 based on a similarity between the audio data 131 and pre-established language models. For example, the ASR component 250 may compare the input audio data 131 with models for sounds (e.g., acoustic units such as phonemes, senons, phones, etc.) and sequences of sounds to identify words that match the sequence of sounds of the speech represented in the input audio data 131. The ASR component 250 may the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in additional detail below with reference to FIG. 7.

Figure 8:
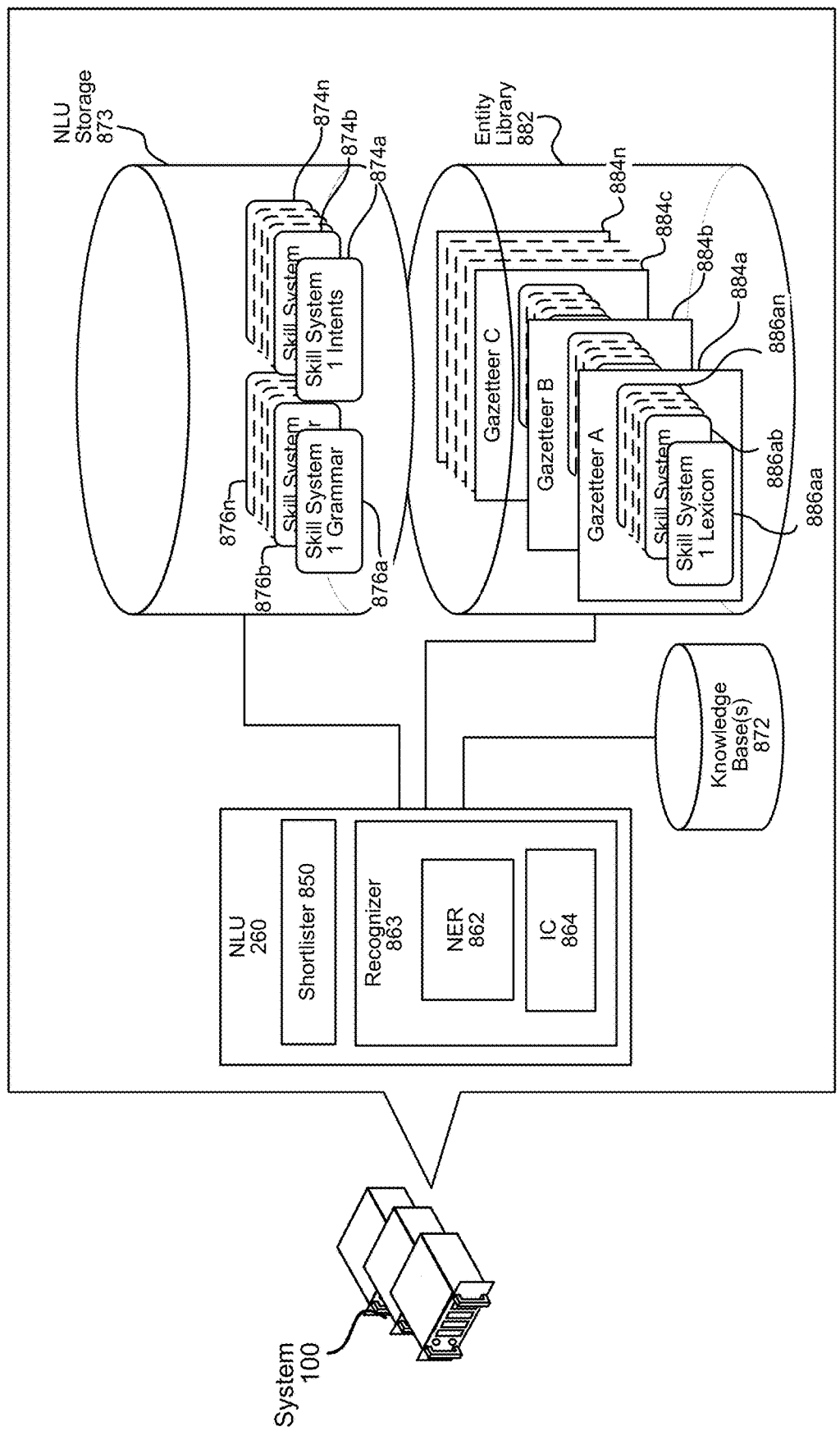
FIGS. 8 and 9 are conceptual diagrams of how natural language processing is performed, according to embodiments of the present disclosure.
Figure 9:
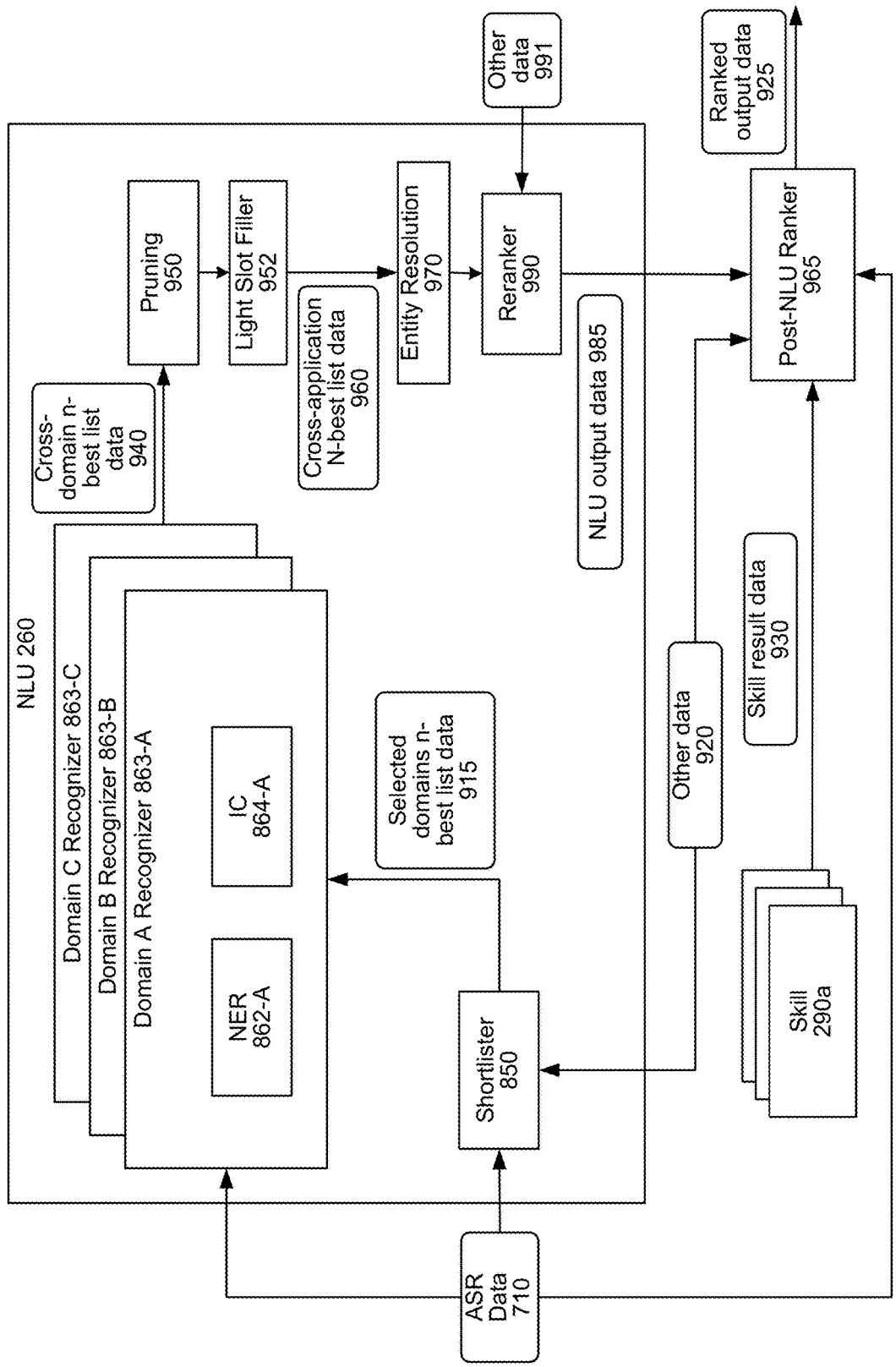

The language processing components 292 may further include a NLU component 260, which is shown in greater detail in FIGS. 8 and 9, that attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the user device 110, the system(s) 120, a skill component 290, a skill system(s) 225, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with a geographic location of the user device 110. In another example, if the text data corresponds to "turn off the lights," the NLU component 260 may determine an intent that the system turn off lights associated with the user device 110 or its user.

The NLU results data may be sent (via, for example, the orchestrator component 230) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis. In some implementations, the NLU component 260 and/or skill component 290 may determine, using the interaction score, text data representing an indication of a handoff from one set of language processing components 292 to another (e.g., corresponding to a different virtual assistant profile).

A skill component 290 may be software running on or in conjunction with the system 100 that is, or is similar to, a software application. A skill component 290 may enable the system 100 to execute specific functionality in order to provide data or produce some other requested output. One example of a skill component 290 is an AED skill component 290b, as described herein, that causes output of prompts for occurrences of an acoustic event and coordinates reconfiguration of the AED components 240 in accordance with corresponding received audio data. The system 100 may be configured with more than one skill component 290. For example, a weather service skill component may enable the system 100 to provide weather information, a car service skill component may enable the system 100 to book a trip with respect to a taxi or ride sharing service, a restaurant skill component may enable the system 100 to order a pizza with respect to the restaurant's online ordering system, etc. A skill component 290 may operate in conjunction between the system(s) 120 and other devices, such as the user device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

Skill support system(s) 225 may communicate with a skill component(s) 290 within the system(s) 120 directly and/or via the orchestrator component 230. A skill support system(s) 225 may be configured to perform one or more actions. A skill may enable a skill support system(s) 225 to execute specific functionality in order to provide data or perform some other action requested by a user. For example, a weather service skill may enable a skill support system(s) 225 to provide weather information to the system(s) 120, a car service skill may enable a skill support system(s) 225 to book a trip with respect to a taxi or ride sharing service, an order pizza skill may enable a skill support system(s) 225 to order a pizza with respect to a restaurant's online ordering system, an AED skill component 290b may re-configure the AED components 240, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system 100 may include a skill component 290 dedicated to interacting with the skill support system(s) 225. A skill, skill device, or skill component may include a skill component 290 operated by the system 100 and/or skill operated by the skill support system(s) 225.

Figure 7:
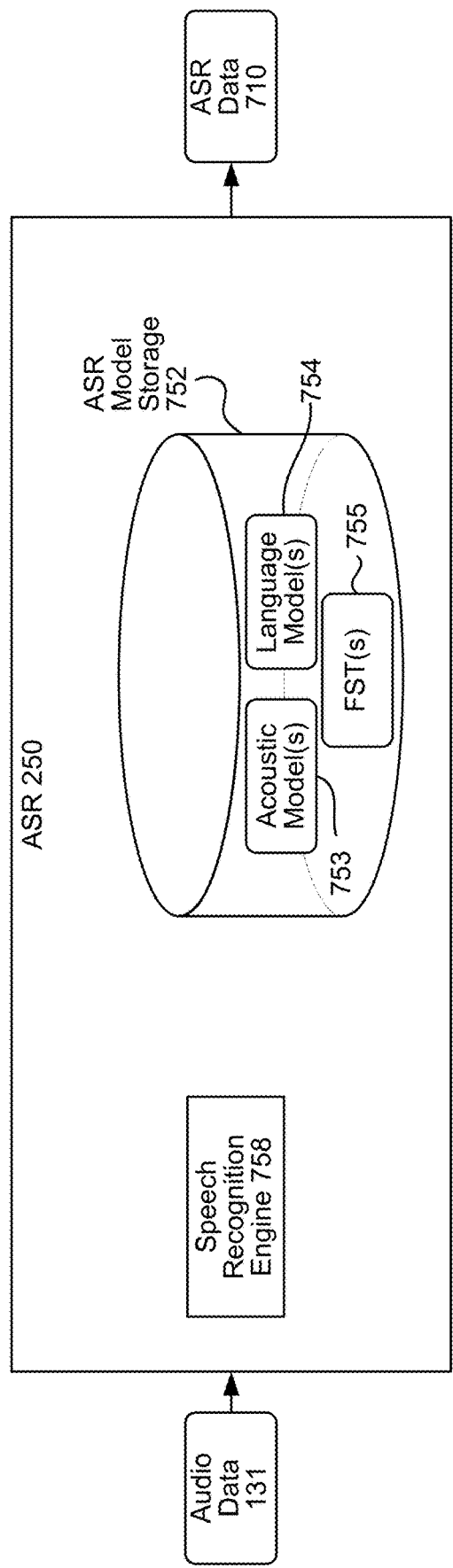
FIG. 7 is a conceptual diagram of an ASR component, according to embodiments of the present disclosure.

The system 100 may include language output components 293 including a natural language generation component 279 and/or a TTS component 280, which is shown in greater detail in FIG. 7. The TTS component 280 may generate audio data (e.g., synthesized speech) from text data using one or more different methods. Text data input to the TTS component 280 may come from a skill component 290, the orchestrator component 230, and/or another component of the system. The text data may include an indication of a speech-processing component and/or data responsive to a command.

The system 100 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to, for example, an application installed on the device 110, the user profile (associated with the presented login information) may be updated to include information about the device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
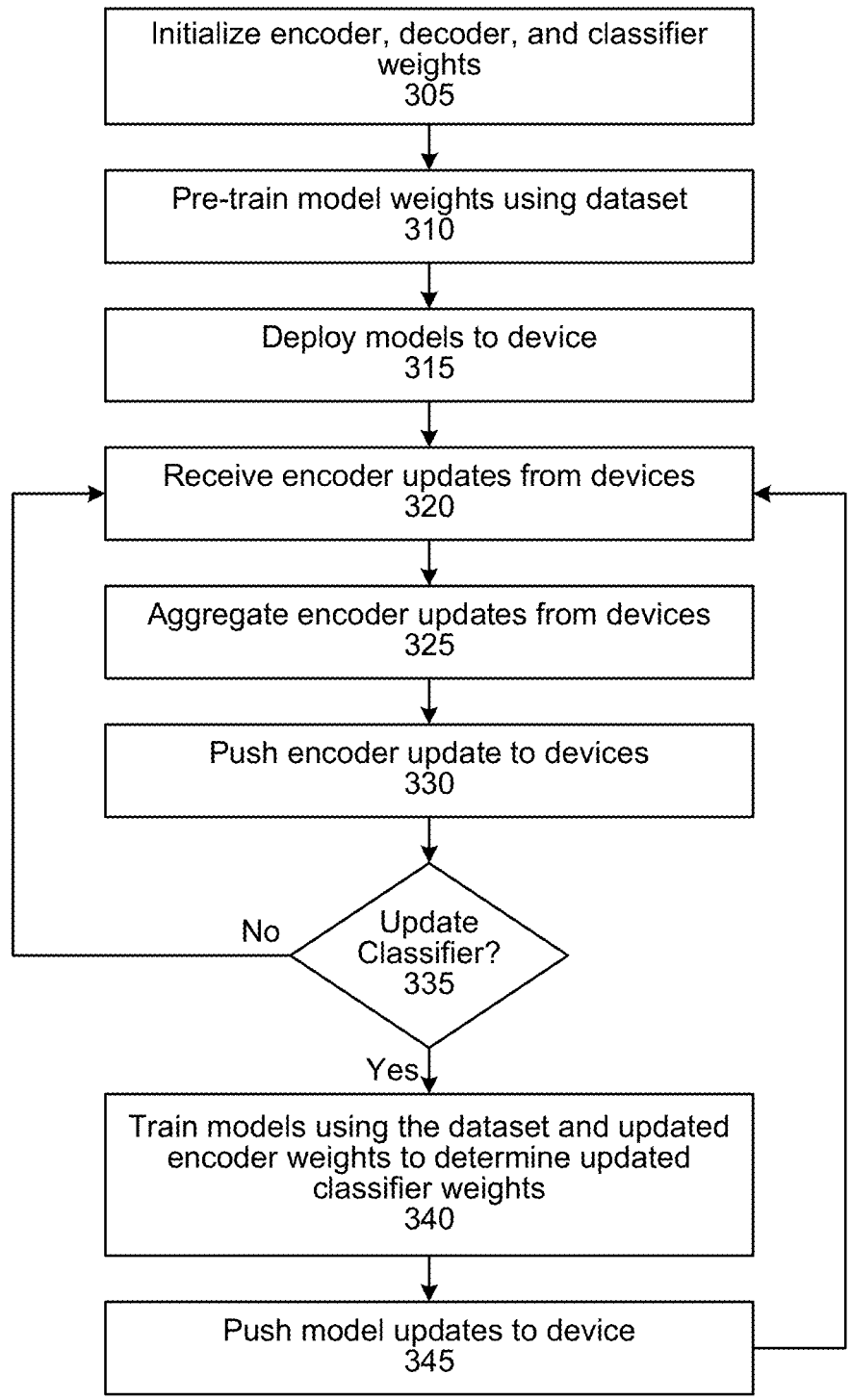
FIG. 3 is a flowchart illustrating an example method of initializing and updating machine learning models configured for acoustic event classification, according to embodiments of the present disclosure.

FIG. 3 is a flowchart illustrating an example method 300 of initializing and updating machine learning models configured for acoustic event classification, according to embodiments of the present disclosure. The method 300 may be performed by the system 100 and its components as described above. The method 300 may include initializing (305) weights of various models used for acoustic event detection including a neural network encoder, decoder, and/or classifier. In some cases, the weights may be initialized with weights from a previous version of the model. In some cases, the weights may be initialized using random numbers within a set range; for example, [0, 1], [−1, 1], [−0.3, 0.3], etc. In some implementations, weights for different cells (e.g., of a neural network) may be initialized differently depending on characteristics of a particular cell. For example, the random numbers used for weight initialization may have different probability distributions (e.g., uniform, Gaussian, etc.). The probability distributions and/ or ranges may be based on, for example, a number of inputs to the cell and/or an activation function used by the cell. The method 300 may include pre-training (310) the model weights using a dataset. The dataset may be a public dataset and/or proprietary dataset comprising annotated audio data. The dataset may be collected from, for example, testing participants who agree to share their data with the system. The dataset may not include user data of any users who have not explicitly granted permission for use of their data. User data used to fine-tune models on user devices is not shared with other devices; rather, update data representing gradients and/or new model weights may be shared via a federated learning technique that shares model data without divulging source (user) data. The method 300 may include deploying (315) the models to one or more devices (e.g., the first device 110). The models may be deployed to the device(s) at a time of manufacture and/or via an over-the-air update to the device(s) while in service. Upon receiving the model(s), a device may process data received by the device (e.g., a local dataset). After using the models to process the local dataset, the device(s) may fine-tune the encoder and return encoder updates (e.g., in the form of updated weights and/or gradients). The method 300 may include receiving (320) encoder updates from the device(s). The method 300 may include aggregating (325) encoder updates from multiple devices. The system may receive updates from multiple devices and combine them using the operations previously described. For example, update data may include gradients and/or weight data. The system may combine the update data arithmetically (e.g., by summing or averaging the gradients/weights). Alternatively, the system may perform knowledge distillation to train a local model based on the update data. The method 300 may include sending (330) the aggregated encoder updates back to the device(s). In some implementations, the method 300 may additionally include updating decoders of the device(s) using a process similar to that described for encoder updates.

After a predetermined amount of time and/or a predetermined number of encoder updates, the classifier may be updated based on the latest iteration of the encoder. The method 300 may include determining (335) whether to update the classifier. If not ("no" at 335), the method 300 may return to the stage 320 and repeat the encoder updating process based on additional encoder updates received. If so ("yes" at 335), the method 300 may include training (340) the classifier using the dataset (e.g., the same dataset used for pre-training at the stage 310). In some implementations, the updated encoder weights determined at the stage 325 may be used as initial encoder weights for the training. In some implementations, the encoder weights determined at the stage 325 may be held constant during training of the classifier. For example, the encoder may process data from the dataset to generate feature data. The classifier may process the feature data to generate event data. The event data may be compared to the annotations of the dataset. Weights of the classifier may be adjusted to reduce a result of a loss function calculated using the event data and annotations. The method 300 may include sending (345) the resulting classifier weights to the device(s) as a classifier update. In some implementations, the system 100 may send the updated encoder weights to the device(s) as part of the same update, if the updated encoder weights have not already been sent to the device(s). The method 300 may return to the stage 320 and repeat the intervening stages for additional encoder and/or classifier updates.

FIG. 4 is flowchart illustrating an example method 400 of using self-supervised federated learning to update a neural network encoder configured to extract audio features from audio data, according to embodiments of the present disclosure. The method 400 may be performed by the system 100 and its components as described above. The method 400 may include initializing (405) various models used for acoustic event detection based on weights received from another device (e.g., the second device 120). The models may include a neural network encoder, a decoder, and a classifier. The method 400 may include receiving (410) a first portion of input data. The input data may be sequential data such as a series of frames of audio data. The method 400 may include processing (415) the first portion (e.g., using a neural network encoder) to determine feature data (e.g., audio feature data). The method 400 may include processing (416) the feature data with an on-device classifier (e.g., a detector) to determine event data. The method 400 may include determining (417) whether an event has been detected. If not ("no" at 417), the method 400 may return to the stage 410 and continue receiving portions of the input data. If so ("yes" at 417), the method 400 may include sending (418) the event data to an event notification component. In some cases, the acoustic event detection may additionally include acoustic event classification, in which the detected event may be classified into a category of event (e.g., glass breaking, door opening, alarm, etc.). The event notification component may send an alert to a device and/or take some other action in response to the detected event.

The stages 416 through 418 of the method 400 may occur at least partially in parallel with other stages of the method 400. The method 400 may include processing (420) the feature data (e.g., using a neural network decoder) to predict a subsequent portion of the input data. The device may store the prediction to compare with a subsequently received portion of the input data. The method 400 may include receiving (425) a subsequent portion of the input data. The subsequent portion may represent, for example, a next frame or block of audio data. the subsequent portion may be the next successive portion of the input data received, or may be a later-received portion following one or more intervening portions of the input data. The method 400 may include analyzing (430) the subsequent portion and the predicted portion to determine update data for the encoder. For example, the subsequent portion and the predicted portion may be compared using a loss function. A result of the loss function may be used to calculate gradients for weights of the neural network encoder and to adjust the weights (e.g., using a stochastic gradient descent algorithm). The update data may include the calculated gradients and/or the adjusted weights. The method 400 may include sending (435) the update data to the second device. The second device may aggregate the update data with that from one or more other devices using, for example, a federated learning technique. The method 400 may include receiving (440) aggregated update data from the second device. The aggregated update data may represent update data compiled from one or more additional devices. The method 400 may include updating (445) weights of the neural network encoder using the aggregated update data.

In some cases, the update data received from the second device may include an update for the classifier model weights as well. The method 400 may include determining (450) whether the update data includes new weights for the classifier. If the update data does not include a classifier update ("no" at 450), the method 400 may return to the stage 410 and receive additional input. If the update data includes new classifier weights ("yes" at 450), the method 400 includes updating (455) the classifier model weights. The method 400 may return to a stage 410 to receive additional portions of the input data, and repeat subsequent stages for further processing of input data and updating of the on-device model(s).

Figure 5A:
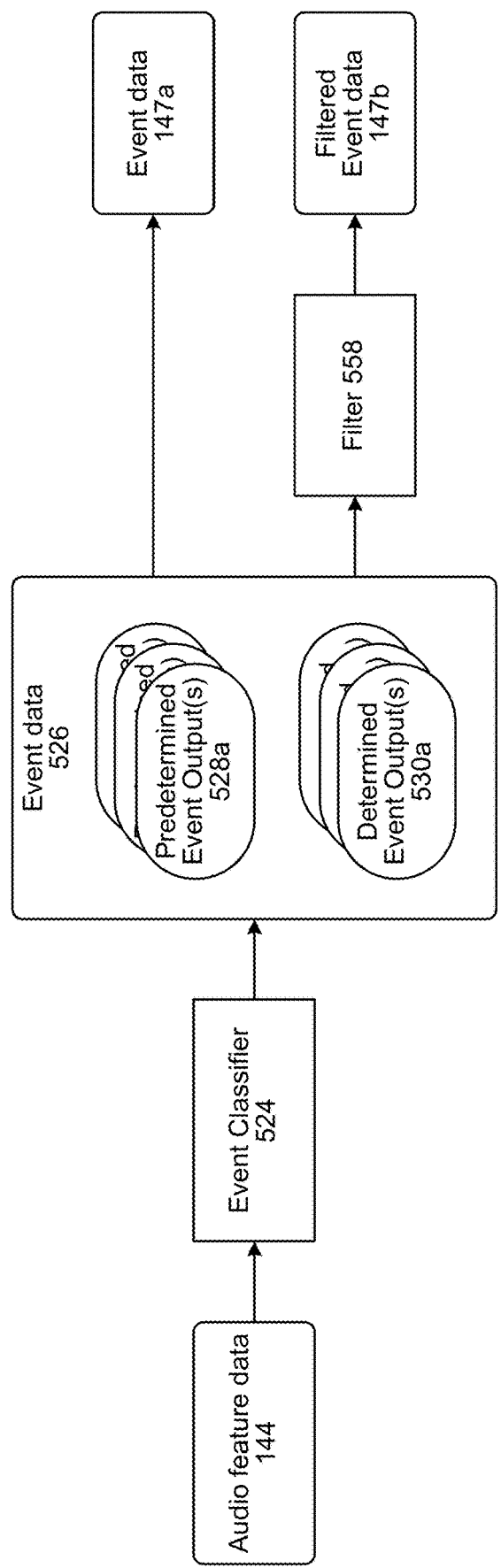

FIGS. 5A and 5B illustrate example detector components 145/155, according to embodiments of the present disclosure. The AED components 240 may include an event classifier 524 which may classify incoming audio data/feature data with respect to whether such data represents an acoustic event that the classifier 524 is trained to recognized as described with reference to FIG. 5A below or otherwise discussed herein. The AED components 240 may additionally or alternatively include an encoded feature data comparator 510, which may perform operations as described with reference to FIG. 5B. The AED components 240 may include additional models such as one or more convolutional neural networks (CRNNs) and/or long short-term memory networks (LSTMs) for detecting prebuild and/or custom sounds. The event classifier 524, comparator 510, and/or other models of the AED components 240 may be updated using the techniques described herein, including self-supervised federated learning. The AED components 240 may output an indication of detection of an event as event data 147. Such event data 147 may include an identifier of the detected event, a score corresponding to the likelihood of detection, or other related data. Such event data 147 may then be sent over network 199 and/or to a downstream component, for example notification system(s) 221/event notification component 248 (e.g., as described below with reference to FIG. 6) or another device.

FIG. 5A illustrates operations of a first example detector component 145/155, according to embodiments of the present disclosure. The detector component 145/155 of FIG. 5A may include an event classifier 524. The event classifier 524 may be a classifier trained to distinguish between different acoustic events and other sounds. Examples of trained classifiers include support-vector machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories (e.g., acoustic event vs. non-acoustic event), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. The event classifier 524 may issue a "score" indicating which category the data most closely matches. The score may provide an indication of how closely the data matches the category. The event classifier 524 may output event data 147 including one or more event detection outputs, each of which may indicate a yes/no decision as to whether an associated acoustic event has occurred.

The detector component 145/155 may analyze the audio feature data 144 using the event classifier 524 to identify one or more predetermined event outputs 528 and/or determined event outputs 530. The event classifier 524 may process the audio feature data 144 determined by the encoder 142 from audio data 131. The event classifier 524 may output one or more event data 147 corresponding to one or more predetermined event outputs(s) 528a, 528b, 528c, etc. and/or one or more determined event output(s) 530a, 530b, 530c, etc. The event classifier 524 may similarly be reconfigured, by the user device 110 and/or second device/system(s) 120, to detect one or more determined event output(s) 530 based at least in part on audio data corresponding to occurrences of new acoustic events.

The audio data corresponding to the occurrences of new acoustic events may be used as training data to re-train the event classifier 524 to detect the new event(s). For example, the event classifier 524 may process the audio feature data 144, and its output may be evaluated using a performance function, such as a loss function, to evaluate its performance in detecting the new event as a new determined event output 530. New values of nodes of the event classifier 524 may be determined using a stochastic process, such as a gradient descent algorithm, and then back-propagated throughout. If the event classifier 524 fails to determine the new event, the system 100 may output further prompts for further audio data representing further occurrences of the event, which then may be used as further training data for the event classifier 524. If the system 120 performs this training, it may send, to the user device 110, configuration data for the AED components 240, which may be instructions that implement an AED components 240 and/or configuration data for re-configuring an existing AED components 240 (e.g., new values for some or all of the weights of the encoder 142, decoder 143, etc.).

As shown in FIG. 5A, the event classifier 524 may determine event raw prediction data 147a; for example, as event data 147a. In some implementations, the detector component 145/155 may include a filter 558 to pass only filtered event data 147b for one or more top-scoring adjusted time windows (e.g., the top 50 or top 100) to other components. The filter 558 may also employ non-maximum suppression (NMS) or other techniques to avoid passing to the other components candidate time windows that may substantially overlap. For example, the filter 558 may evaluate incoming candidate adjusted time windows in the event prediction data 526 against each other to make sure that individual candidate time windows are sufficiently independent from each other. The filtered event output data 147b may not necessarily, however, include scores for the time windows.

FIG. 5B illustrates operations of a second example detector component 145/155, according to embodiments of the present disclosure. An encoded feature data comparator 510 may receive and process the audio feature data 144 generated by the neural network encoder 142. The encoded feature data comparator 510 may analyze the audio feature data 144 with respect to one or more items of predetermined event data 512a, 512b, and/or 512c, etc. (collectively "predetermined event data 512"), each of which may correspond to a predetermined event, such as a generic doorbell ring. For example, the encoded feature data comparator 510 may calculate a cosine similarity between the embeddings and the predetermined event data 512. If each of the values of the audio feature data 144 (e.g., each of the values of the N-vector) are within a threshold or thresholds of each of the corresponding values of one of the predetermined event data 512, the encoded feature data comparator 510 may determine that a corresponding event occurred and may send event data 147 indicating the detected event to other components of the system 100 for further processing (e.g., output corresponding to detection of the event).

Figure 6:
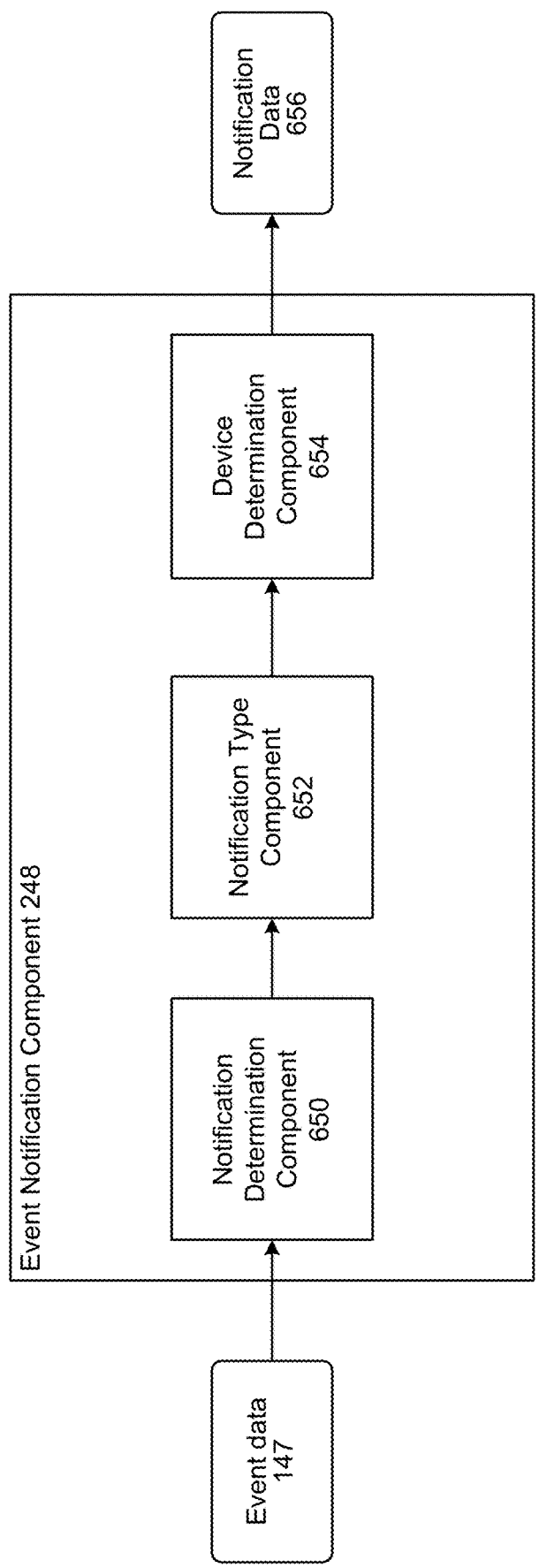
FIG. 6 illustrates an event notification component according to embodiments of the present disclosure.

FIG. 6 illustrates an event notification component 248 according to embodiments of the present disclosure. As shown in FIG. 6, the event notification component 248 may include a notification-determination component 650, a notification-type component 652, and/or a device-determination component 654. The notification-determination component 650 may receive one or more of the event data 147 and determine if a notification corresponding to the event(s) should be sent to one or more device(s). The event data 147 may, for example, indicate a first kind of event, such as glass breaking or a baby crying, and the notification-determination component 650 may determine that a corresponding notification should be sent to a user device. The event data 147 may, on the other hand, indicate a second kind of event, such as a dog bark, and the notification-determination component 650 may determine that no notification may be sent. The notification-determination component 650 may make this determination by determining data identifying the event and determining a corresponding user preference (as stored in, for example, the profile storage 270) for receiving notifications corresponding to the event. That is, a user of the user device may have input a preference for receiving a notification corresponding to a particular event, and the notification-determination component 650 may determine to send a notification based on the preference. In some embodiments, the notification-determination component 650 determines whether or not to send a notification based at least in part on the type of the event. For example, if the event corresponds to a potentially dangerous or rare event, such as glass breaking, the notification-determination component 650 may determine to send the notification.

The notification-type component 652 may determine the type of the notification to be sent. Types of notifications may include text messages, emails, phone calls, push notifications, or other such notifications. Like the notification-determination component 650, the notification-type component 652 may determine the type of the notification based on a user preference stored in the profile storage 270. The notification-type component 652 may similarly determine the type of the notification based on the type of the event, wherein potentially dangerous or rare events may correspond to a first type of notification, such as a phone call, while other types of events may correspond to a second type of notification, such as an email.

A device-determination component 654 may determine which of a potential plurality of user devices should receive the notification(s). In some embodiments, the device-determination component 654 may determine that the notification(s) (e.g., notification data 656) are to be sent to every device associated with a user account stored in the profile storage 270. In other embodiments, the device-determination component 654 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The described system 100 may be used to create various acoustic event detection data for different events as detectable by different devices in different locations. For example, for a same acoustic event, the system 100 may prompt the user to walk through audio capture by several different devices (for example one device in the living room, one device in the kitchen, etc.). The system 100 may instruct the user to cause the event and may capture acoustic data from multiple different devices while the event occurs. The system 100 may use this combined information to form one set of AED configuration data that may be used by multiple devices (e.g., jointly trained AED data goes to each device). Alternatively (or in addition) the system 100 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The described system 100 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system 100 may create one set of AED configuration data (e.g., trained AED model) for the acoustic event from a first location and another set of AED configuration data (e.g., trained AED model) for the acoustic event from a second location different from the first location. To do so the system 100 may need to go through the training/prompting steps for each location and then may capture respective audio data corresponding to the respective location in order to train the separate AED model(s). The AED model(s) may then be loaded onto a device 110 which, when it attempts to detect a future event, may operate both AED model(s). Thus if a particular model is used to detect the event, the device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the device 110 may output an indication that the event was detected in location A.

In certain configurations, if the user replaces a device 110a at a particular location, the user may indicate to the system 100 that the new device 110b will be located at the same location. The system 100 may then send the appropriate AED configuration data (e.g., AED model(s)) to the new device 110b so the new device 110b can be configured to recognize the same acoustic events as the older device 110a.

FIG. 7 is a conceptual diagram of an ASR component 250, according to embodiments of the present disclosure. The ASR component 250 may interpret a spoken natural language input based on the similarity between the spoken natural language input and pre-established language models 754 stored in an ASR model storage 752. For example, the ASR component 250 may compare the audio data with models for sounds (e.g., subword units or phonemes) and sequences of sounds to identify words that match the sequence of sounds spoken in the natural language input.

Alternatively, the ASR component 250 may use a finite state transducer (FST) 755 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 758. The ASR component 250 receives audio data 131 (for example, received from a local device 110 having processed audio detected by a microphone by an acoustic front end (AFE) or other component). The speech recognition engine 758 compares the audio data 131 with acoustic models 753, language models 754, FST(s) 755, and/or other data models and information for recognizing the speech conveyed in the audio data. The audio data 131 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 131 with reference to information stored in the ASR model storage 752. Feature vectors of the audio data 131 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 131 may be processed by one or more acoustic model(s) 753 to determine acoustic unit data. The acoustic unit data may include indicators of acoustic units detected in the audio data 131 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 260) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound.

Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

FIGS. 8 and 9 illustrates how the NLU component 260 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 850. The shortlister component 850 selects skills that may execute with respect to ASR output data 710 input to the NLU component 260 (e.g., applications that may execute with respect to the user input). The ASR output data 710 (which may also be referred to as ASR data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 260 may process ASR output data 710 input thereto with respect to every skill of the system, either in parallel, in series, or using some combination thereof. By implementing a shortlister component 850, the NLU component 260 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 225 associated with a skill may provide the system(s) 120 with training text data representing sample user inputs that may be provided by a user to invoke the skill. For example, for a ride sharing skill, a skill system(s) 225 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 225 associated with the skill regarding whether the determined other user input structures are permissible, from the perspective of the skill system(s) 225, to be used to invoke the skill. The alternate user input structures may be derived by one or more trained models during model training and/or may be based on user input structures provided by different skills. The skill system(s) 225 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 225, and related sample user inputs potentially determined during training, as binary examples to train a model associated with a skill associated with the skill system(s) 225. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 260 may include one or more recognizers 863. In at least some embodiments, a recognizer 863 may be associated with a skill system 225 (e.g., the recognizer may be configured to interpret text data to correspond to the skill system 225). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 260) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 250 or output from the device 110*b* (as illustrated in FIG. 9). The ASR component 250 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 250. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 710, for example as determined by a user recognition component.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 850 receives the ASR output data 710, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 710. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 230) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 230 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 230 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 260 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 260 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 260 may include multiple entity resolution components 970 and each entity resolution component 970 may be specific to one or more domains.

The NLU component 260 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 1A). The NLU component 260 may separately perform NLU processing described above with respect to domains associated with skills that are at least partially implemented as part of the skill system(s) 225. In an example, the shortlister component 850 may only process with respect to these latter domains. Results of these two NLU processing paths may be merged into NLU output data 985, which may be sent to a post-NLU ranker 965, which may be implemented by the system(s) 120.

The post-NLU ranker 965 may include a statistical component that produces a ranked list of intent/skill pairs with associated confidence scores. Each confidence score may indicate an adequacy of the skill's execution of the intent with respect to NLU results data associated with the skill. The post-NLU ranker 965 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 965. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 965 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 965 (or other scheduling component such as orchestrator component 230) may solicit the first skill and the second skill to provide potential result data 930 based on the first NLU hypothesis and the second NLU hypothesis, respectively. For example, the post-NLU ranker 965 may send the first NLU hypothesis to the first skill component 290*a* along with a request for the first skill component 290*a* to at least partially execute with respect to the first NLU hypothesis. The post-NLU ranker 965 may also send the second NLU hypothesis to the second skill component 290*b* along with a request for the second skill component 290*b* to at least partially execute with respect to the second NLU hypothesis. The post-NLU ranker 965 receives, from the first skill component 290*a*, first result data 930*a* generated from the first skill component 290*a*'s execution with respect to the first NLU hypothesis. The post-NLU ranker 965 also receives, from the second skill component 290*b*, second results data 930*b* generated from the second skill component 290*b*'s execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 225 to locate the data to be output to a user. The result data 930 may also include an instruction. For example, if the user input corresponds to "turn on the light," the result data 930 may include an instruction causing the system to turn on a light associated with a profile of the device (110*a*/110*b*) and/or user.

The post-NLU ranker 965 may consider the first result data 930*a* and the second result data 930*b* to alter the first confidence score and the second confidence score of the first NLU hypothesis and the second NLU hypothesis, respectively. That is, the post-NLU ranker 965 may generate a third confidence score based on the first result data 930*a* and the first confidence score. The third confidence score may correspond to how likely the post-NLU ranker 965 determines the first skill will correctly respond to the user input. The post-NLU ranker 965 may also generate a fourth confidence score based on the second result data 930*b* and the second confidence score. One skilled in the art will appreciate that a first difference between the third confidence score and the fourth confidence score may be greater than a second difference between the first confidence score and the second confidence score. The post-NLU ranker 965 may also consider the other data 920 to generate the third confidence score and the fourth confidence score. While it has been described that the post-NLU ranker 965 may alter the confidence scores associated with first and second NLU hypotheses, one skilled in the art will appreciate that the post-NLU ranker 965 may alter the confidence scores of more than two NLU hypotheses. The post-NLU ranker 965 may select the result data 930 associated with the skill component 290 with the highest altered confidence score to be the data output in response to the current user input. The post-NLU ranker 965 may also consider the ASR output data 710 to alter the NLU hypotheses confidence scores.

The orchestrator component 230 may, prior to sending the NLU results data 985 to the post-NLU ranker 965, associate intents in the NLU hypotheses with skill components 290. For example, if a NLU hypothesis includes a <PlayMusic> intent, the orchestrator component 230 may associate the NLU hypothesis with one or more skill components 290 that can execute the <PlayMusic> intent. Thus, the orchestrator component 230 may send the NLU results data 985, including NLU hypotheses paired with skill components 290, to the post-NLU ranker 965. In response to ASR output data 710 corresponding to "what should I do for dinner today," the orchestrator component 230 may generates pairs of skill components 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 965 queries each skill component 290, paired with a NLU hypothesis in the NLU output data 985, to provide result data 930 based on the NLU hypothesis with which it is associated. That is, with respect to each skill, the post-NLU ranker 965 colloquially asks the each skill "if given this NLU hypothesis, what would you do with it." According to the above example, the post-NLU ranker 965 may send skill components 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 965 may query each of the skill components 290 in parallel or substantially in parallel.

A skill component 290 may provide the post-NLU ranker 965 with various data and indications in response to the post-NLU ranker 965 soliciting the skill component 290 for result data 930. A skill component 290 may simply provide the post-NLU ranker 965 with an indication of whether or not the skill can execute with respect to the NLU hypothesis it received. A skill component 290 may also or alternatively provide the post-NLU ranker 965 with output data generated based on the NLU hypothesis it received. In some situations, a skill component 290 may need further information in addition to what is represented in the received NLU hypothesis to provide output data responsive to the user input. In these situations, the skill component 290 may provide the post-NLU ranker 965 with result data 930 indicating slots of a framework that the skill component 290 further needs filled or entities that the skill component 290 further needs resolved prior to the skill component 290 being able to provided result data 930 responsive to the user input. The skill component 290 may also provide the post-NLU ranker 965 with an instruction and/or computer-generated speech indicating how the skill component 290 recommends the system solicit further information needed by the skill component 290. The skill component 290 may further provide the post-NLU ranker 965 with an indication of whether the skill component 290 will have all needed information after the user provides additional information a single time, or whether the skill component 290 will need the user to provide various kinds of additional information prior to the skill component 290 having all needed information. According to the above example, skill components 290 may provide the post-NLU ranker 965 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 930 includes an indication provided by a skill component 290 indicating whether or not the skill component 290 can execute with respect to a NLU hypothesis; data generated by a skill component 290 based on a NLU hypothesis; as well as an indication provided by a skill component 290 indicating the skill component 290 needs further information in addition to what is represented in the received NLU hypothesis.

The post-NLU ranker 965 uses the result data 930 provided by the skill components 290 to alter the NLU processing confidence scores generated by the reranker 990. That is, the post-NLU ranker 965 uses the result data 930 provided by the queried skill components 290 to create larger differences between the NLU processing confidence scores generated by the reranker 990. Without the post-NLU ranker 965, the system may not be confident enough to determine an output in response to a user input, for example when the NLU hypotheses associated with multiple skills are too close for the system to confidently determine a single skill component 290 to invoke to respond to the user input. For example, if the system does not implement the post-NLU ranker 965, the system may not be able to determine whether to obtain output data from a general reference information skill or a medical information skill in response to a user input corresponding to "what is acne."

The post-NLU ranker 965 may prefer skill components 290 that provide result data 930 responsive to NLU hypotheses over skill components 290 that provide result data 930 corresponding to an indication that further information is needed, as well as skill components 290 that provide result data 930 indicating they can provide multiple responses to received NLU hypotheses. For example, the post-NLU ranker 965 may generate a first score for a first skill component 290a that is greater than the first skill's NLU confidence score based on the first skill component 290a providing result data 930a including a response to a NLU hypothesis. For further example, the post-NLU ranker 965 may generate a second score for a second skill component 290b that is less than the second skill's NLU confidence score based on the second skill component 290b providing result data 930b indicating further information is needed for the second skill component 290b to provide a response to a NLU hypothesis. Yet further, for example, the post-NLU ranker 965 may generate a third score for a third skill component 290c that is less than the third skill's NLU confidence score based on the third skill component 290c providing result data 930c indicating the third skill component 290c can provide multiple responses to a NLU hypothesis.

The post-NLU ranker 965 may consider other data 920 in determining scores. The other data 920 may include rankings associated with the queried skill components 290. A ranking may be a system ranking or a user-specific ranking. A ranking may indicate a veracity of a skill from the perspective of one or more users of the system. For example, the post-NLU ranker 965 may generate a first score for a first skill component 290a that is greater than the first skill's NLU processing confidence score based on the first skill component 290a being associated with a high ranking. For further example, the post-NLU ranker 965 may generate a second score for a second skill component 290b that is less than the second skill's NLU processing confidence score based on the second skill component 290b being associated with a low ranking.

The other data 920 may include information indicating whether or not the user that originated the user input has enabled one or more of the queried skill components 290. For example, the post-NLU ranker 965 may generate a first score for a first skill component 290a that is greater than the first skill's NLU processing confidence score based on the first skill component 290a being enabled by the user that originated the user input. For further example, the post-NLU ranker 965 may generate a second score for a second skill component 290b that is less than the second skill's NLU processing confidence score based on the second skill component 290b not being enabled by the user that originated the user input. When the post-NLU ranker 965 receives the NLU results data 985, the post-NLU ranker 965 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 965 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 965 may increase the NLU processing confidence score associated with a first skill configured to output visual data and/or decrease the NLU processing confidence score associated with a second skill configured to output audio data.

The other data 920 may include information indicating the veracity of the result data 930 provided by a skill component 290. For example, if a user says "tell me a recipe for pasta sauce," a first skill component 290a may provide the post-NLU ranker 965 with first result data 930a corresponding to a first recipe associated with a five star rating and a second skill component 290b may provide the post-NLU ranker 965 with second result data 930b corresponding to a second recipe associated with a one star rating. In this situation, the post-NLU ranker 965 may increase the NLU processing confidence score associated with the first skill component 290a based on the first skill component 290a providing the first result data 930a associated with the five star rating and/or decrease the NLU processing confidence score associated with the second skill component 290b based on the second skill component 290b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 965 may increase the NLU processing confidence score associated with a first skill component 290a corresponding to a room service skill associated with the hotel and/or decrease the NLU processing confidence score associated with a second skill component 290b corresponding to a food skill not associated with the hotel.

The other data 920 may include information indicating a location of the device and/or user that originated the user input. The system may be configured with skill components 290 that may only operate with respect to certain geographic locations. For example, a user may provide a user input corresponding to "when is the next train to Portland." A first skill component 290a may operate with respect to trains that arrive at, depart from, and pass through Portland, Oregon. A second skill component 290b may operate with respect to trains that arrive at, depart from, and pass through Portland, Maine. If the device and/or user that originated the user input is located in Seattle, Washington, the post-NLU ranker 965 may increase the NLU processing confidence score associated with the first skill component 290a and/or decrease the NLU processing confidence score associated with the second skill component 290b. Likewise, if the device and/or user that originated the user input is located in Boston, Massachusetts, the post-NLU ranker 965 may increase the NLU processing confidence score associated with the second skill component 290b and/or decrease the NLU processing confidence score associated with the first skill component 290a.

The other data 920 may include information indicating a time of day. The system may be configured with skill components 290 that operate with respect to certain times of day. For example, a user may provide a user input corresponding to "order me food." A first skill component 290a may generate first result data 930a corresponding to breakfast. A second skill component 290b may generate second result data 930b corresponding to dinner. If the system(s) 120 receives the user input in the morning, the post-NLU ranker 965 may increase the NLU processing confidence score associated with the first skill component 290a and/or decrease the NLU processing score associated with the second skill component 290b. If the system(s) 120 receives the user input in the afternoon or evening, the post-NLU ranker 965 may increase the NLU processing confidence score associated with the second skill component 290b and/or decrease the NLU processing confidence score associated with the first skill component 290a.

The other data 920 may include information indicating user preferences. The system may include multiple skill components 290 configured to execute in substantially the same manner. For example, a first skill component 290a and a second skill component 290b may both be configured to order food from respective restaurants. The system may store a user preference (e.g., in the profile storage 270) that is associated with the user that provided the user input to the system(s) 120 as well as indicates the user prefers the first skill component 290a over the second skill component 290b. Thus, when the user provides a user input that may be executed by both the first skill component 290a and the second skill component 290b, the post-NLU ranker 965 may increase the NLU processing confidence score associated with the first skill component 290a and/or decrease the NLU processing confidence score associated with the second skill component 290b.

The other data 920 may include information indicating system usage history associated with the user that originated the user input. For example, the system usage history may indicate the user originates user inputs that invoke a first skill component 290a more often than the user originates user inputs that invoke a second skill component 290b. Based on this, if the present user input may be executed by both the first skill component 290a and the second skill component 290b, the post-NLU ranker 965 may increase the NLU processing confidence score associated with the first skill component 290a and/or decrease the NLU processing confidence score associated with the second skill component 290b.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 965 may increase the NLU processing confidence score associated with a first skill component 290a that generates audio data. The post-NLU ranker 965 may also or alternatively decrease the NLU processing confidence score associated with a second skill component 290b that generates image data or video data.

The other data 920 may include information indicating how long it took a skill component 290 to provide result data 930 to the post-NLU ranker 965. When the post-NLU ranker 965 multiple skill components 290 for result data 930, the skill components 290 may respond to the queries at different speeds. The post-NLU ranker 965 may implement a latency budget. For example, if the post-NLU ranker 965 determines a skill component 290 responds to the post-NLU ranker 965 within a threshold amount of time from receiving a query from the post-NLU ranker 965, the post-NLU ranker 965 may increase the NLU processing confidence score associated with the skill component 290. Conversely, if the post-NLU ranker 965 determines a skill component 290 does not respond to the post-NLU ranker 965 within a threshold amount of time from receiving a query from the post-NLU ranker 965, the post-NLU ranker 965 may decrease the NLU processing confidence score associated with the skill component 290.

It has been described that the post-NLU ranker 965 uses the other data 920 to increase and decrease NLU processing confidence scores associated with various skill components 290 that the post-NLU ranker 965 has already requested result data from. Alternatively, the post-NLU ranker 965 may use the other data 920 to determine which skill components 290 to request result data from. For example, the post-NLU ranker 965 may use the other data 920 to increase and/or decrease NLU processing confidence scores associated with skill components 290 associated with the NLU results data 985 output by the NLU component 260. The post-NLU ranker 965 may select n-number of top scoring altered NLU processing confidence scores. The post-NLU ranker 965 may then request result data 930 from only the skill components 290 associated with the selected n-number of NLU processing confidence scores.

As described, the post-NLU ranker 965 may request result data 930 from all skill components 290 associated with the NLU results data 985 output by the NLU component 260. Alternatively, the system(s) 120 may prefer result data 930 from skills implemented entirely by the system(s) 120 rather than skills at least partially implemented by the skill system(s) 225. Therefore, in the first instance, the post-NLU ranker 965 may request result data 930 from only skills associated with the NLU results data 985 and entirely implemented by the system(s) 120. The post-NLU ranker 965 may only request result data 930 from skills associated with the NLU results data 985, and at least partially implemented by the skill system(s) 225, if none of the skills, wholly implemented by the system(s) 120, provide the post-NLU ranker 965 with result data 930 indicating either data response to the NLU results data 985, an indication that the skill can execute the user input, or an indication that further information is needed.

As indicated above, the post-NLU ranker 965 may request result data 930 from multiple skill components 290. If one of the skill components 290 provides result data 930 indicating a response to a NLU hypothesis and the other skills provide result data 930 indicating either they cannot execute or they need further information, the post-NLU ranker 965 may select the result data 930 including the response to the NLU hypothesis as the data to be output to the user. If more than one of the skill components 290 provides result data 930 indicating responses to NLU hypotheses, the post-NLU ranker 965 may consider the other data 920 to generate altered NLU processing confidence scores, and select the result data 930 of the skill associated with the greatest score as the data to be output to the user.

A system that does not implement the post-NLU ranker 965 may select the highest scored NLU hypothesis in the NLU results data 985. The system may send the NLU hypothesis to a skill component 290 associated therewith along with a request for output data. In some situations, the skill component 290 may not be able to provide the system with output data. This results in the system indicating to the user that the user input could not be processed even though another skill associated with lower ranked NLU hypothesis could have provided output data responsive to the user input.

The post-NLU ranker 965 reduces instances of the aforementioned situation. As described, the post-NLU ranker 965 queries multiple skills associated with the NLU results data 985 to provide result data 930 to the post-NLU ranker 965 prior to the post-NLU ranker 965 ultimately determining the skill component 290 to be invoked to respond to the user input. Some of the skill components 290 may provide result data 930 indicating responses to NLU hypotheses while other skill components 290 may providing result data 930 indicating the skills cannot provide responsive data. Whereas a system not implementing the post-NLU ranker 965 may select one of the skill components 290 that could not provide a response, the post-NLU ranker 965 only selects a skill component 290 that provides the post-NLU ranker 965 with result data corresponding to a response, indicating further information is needed, or indicating multiple responses can be generated.

The post-NLU ranker 965 may select result data 930, associated with the skill component 290 associated with the highest score, for output to the user. Alternatively, the post-NLU ranker 965 may output ranked output data 925 indicating skill components 290 and their respective post-NLU ranker rankings. Since the post-NLU ranker 965 receives result data 930, potentially corresponding to a response to the user input, from the skill components 290 prior to post-NLU ranker 965 selecting one of the skills or outputting the ranked output data 925, little to no latency occurs from the time skills provide result data 930 and the time the system outputs responds to the user.

If the post-NLU ranker 965 selects result audio data to be output to a user and the system determines content should be output audibly, the post-NLU ranker 965 (or another component of the system(s) 120) may cause the device 110*a* and/or the device 110*b* to output audio corresponding to the result audio data. If the post-NLU ranker 965 selects result text data to output to a user and the system determines content should be output visually, the post-NLU ranker 965 (or another component of the system(s) 120) may cause the device 110*b* to display text corresponding to the result text data. If the post-NLU ranker 965 selects result audio data to output to a user and the system determines content should be output visually, the post-NLU ranker 965 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 965 selects result text data to output to a user and the system determines content should be output audibly, the post-NLU ranker 965 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill component 290 may provide result data 930 either indicating a response to the user input, indicating more information is needed for the skill component 290 to provide a response to the user input, or indicating the skill component 290 cannot provide a response to the user input. If the skill component 290 associated with the highest post-NLU ranker score provides the post-NLU ranker 965 with result data 930 indicating a response to the user input, the post-NLU ranker 965 (or another component of the system(s) 120, such as the orchestrator component 230) may simply cause content corresponding to the result data 930 to be output to the user. For example, the post-NLU ranker 965 may send the result data 930 to the orchestrator component 230. The orchestrator component 230 may cause the result data 930 to be sent to the device (110*a*/110*b*), which may output audio and/or display text corresponding to the result data 930. The orchestrator component 230 may send the result data 930 to the ASR component 250 to generate output text data and/or may send the result data 930 to the TTS component 280 to generate output audio data, depending on the situation.

The skill component 290 associated with the highest post-NLU ranker score may provide the post-NLU ranker 965 with result data 930 indicating more information is needed as well as instruction data. The instruction data may indicate how the skill component 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 965 may simply cause the received instruction data be output by the device (110*a*/110*b*). Alternatively, the instruction data may be in a format that is not capable of being output by the device (110*a*/110*b*). When this occurs, the post-NLU ranker 965 may cause the ASR component 250 or the TTS component 280 to process the instruction data, depending on the situation, to generate instruction data that may be output by the device (110*a*/110*b*). Once the user provides the system with all further information needed by the skill component 290, the skill component 290 may provide the system with result data 930 indicating a response to the user input, which may be output by the system as detailed above.

The system may include "informational" skill components 290 that simply provide the system with information, which the system outputs to the user. The system may also include "transactional" skill components 290 that require a system instruction to execute the user input. Transactional skill components 290 include ride sharing skills, flight booking skills, etc. A transactional skill component 290 may simply provide the post-NLU ranker 965 with result data 930 indicating the transactional skill component 290 can execute the user input. The post-NLU ranker 965 may then cause the system to solicit the user for an indication that the system is permitted to cause the transactional skill component 290 to execute the user input. The user-provided indication may be an audible indication or a tactile indication (e.g., activation of a virtual button or input of text via a virtual keyboard). In response to receiving the user-provided indication, the system may provide the transactional skill component 290 with data corresponding to the indication. In response, the transactional skill component 290 may execute the command (e.g., book a flight, book a train ticket, etc.). Thus, while the system may not further engage an informational skill component 290 after the informational skill component 290 provides the post-NLU ranker 965 with result data 930, the system may further engage a transactional skill component 290 after the transactional skill component 290 provides the post-NLU ranker 965 with result data 930 indicating the transactional skill component 290 may execute the user input.

In some instances, the post-NLU ranker 965 may generate respective scores for first and second skills that are too close (e.g., are not different by at least a threshold difference) for the post-NLU ranker 965 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 230, post-NLU ranker 965, shortlister component 850, or other component may be trained and operated according to various machine learning techniques.

Figure 10:
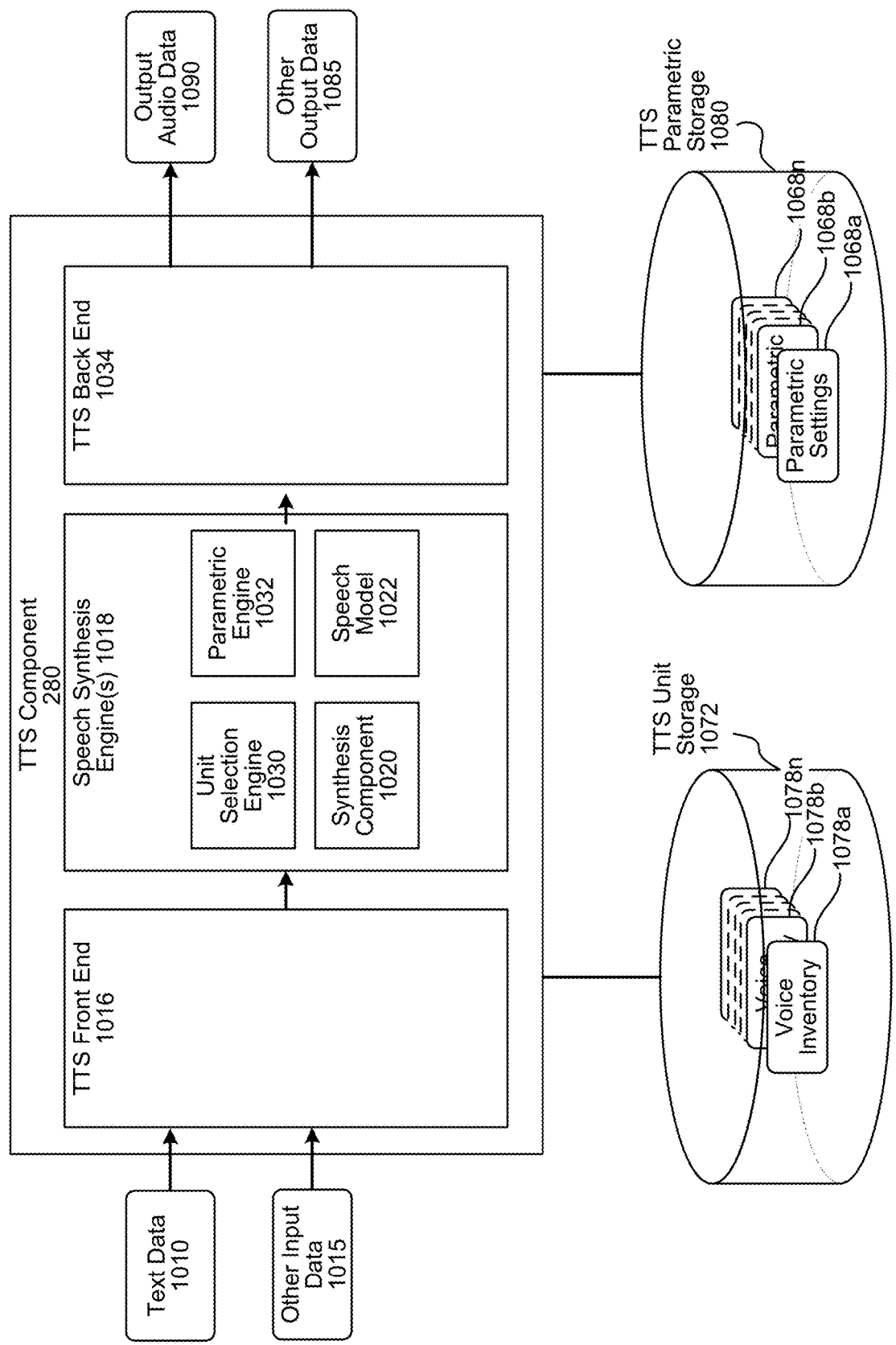
FIG. 10 is a conceptual diagram of text-to-speech components according to embodiments of the present disclosure.

Components of a system that may be used to perform unit selection, parametric TTS processing, and/or model-based audio synthesis are shown in FIG. 10. As shown in FIG. 10, the TTS component 280 may include a TTS front end 1016, a speech synthesis engine 1018, TTS unit storage 1072, TTS parametric storage 1080, and a TTS back end 1034. The TTS unit storage 1072 may include, among other things, voice inventories 1078a-1078n that may include pre-recorded audio segments (called units) to be used by the unit selection engine 1030 when performing unit selection synthesis as described below. The TTS parametric storage 1080 may include, among other things, parametric settings 1068a-1068n that may be used by the parametric synthesis engine 1032 when performing parametric synthesis as described below. A particular set of parametric settings 1068 may correspond to a particular voice profile (e.g., whispered speech, excited speech, etc.).

In various embodiments of the present disclosure, model-based synthesis of audio data may be performed using by a speech model 1022 and a TTS front end 1016. The TTS front end 1016 may be the same as front ends used in traditional unit selection or parametric systems. In other embodiments, some or all of the components of the TTS front end 1016 are based on other trained models. The present disclosure is not, however, limited to any particular type of TTS front end 1016. The speech model 1022 may be used to synthesize speech without requiring the TTS unit storage 1072 or the TTS parametric storage 1080, as described in greater detail below.

TTS component receives text data 1010. Although the text data 1010 in FIG. 10 is input into the TTS component 280, it may be output by other component(s) (such as a skill component 290, NLU component 260, NLG component 279 or other component) and may be intended for output by the system. Thus, in certain instances text data 1010 may be referred to as "output text data." Further, the data 1010 may not necessarily be text, but may include other data (such as symbols, code, other data, etc.) that may reference text (such as an indicator of a word) that is to be synthesized. Thus data 1010 may come in a variety of forms. The TTS front end 1016 transforms the data 1010 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1018. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1010, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1016 may also process other input data 1015, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1010 and/or the text for a TTS request may be accompanied by separate metadata indicating what text should be whispered (or have some other indicated audio characteristic). The speech synthesis engine 1018 may compare the annotated phonetic units models and information stored in the TTS unit storage 1072 and/or TTS parametric storage 1080 for converting the input text into speech. The TTS front end 1016 and speech synthesis engine 1018 may include their own controller(s)/processor(s) and memory or they may use the controller/processor and memory of the server 120, device 110, or other device, for example. Similarly, the instructions for operating the TTS front end 1016 and speech synthesis engine 1018 may be located within the TTS component 280, within the memory and/or storage of the server 120, device 110, or within an external device.

Text data 1010 input into the TTS component 280 may be sent to the TTS front end 1016 for processing. The front end 1016 may include components for performing text normalization, linguistic analysis, linguistic prosody generation, or other such components. During text normalization, the TTS front end 1016 may first process the text input and generate standard text, converting such things as numbers, abbreviations (such as Apt., St., etc.), symbols ($, %, etc.) into the equivalent of written out words.

During linguistic analysis, the TTS front end 1016 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1072. The linguistic analysis performed by the TTS front end 1016 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1016 may then perform linguistic prosody generation where the phonetic units are annotated with desired prosodic characteristics, also called acoustic features, which indicate how the desired phonetic units are to be pronounced in the eventual output speech. During this stage the TTS front end 1016 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1016, which may be referred to as a symbolic linguistic representation, may include a sequence of phonetic units annotated with prosodic characteristics. This symbolic linguistic representation may be sent to the speech synthesis engine 1018, which may also be known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, described further below, a unit selection engine 1030 matches the symbolic linguistic representation created by the TTS front end 1016 against a database of recorded speech, such as a database (e.g., TTS unit storage 1072) storing information regarding one or more voice corpuses (e.g., voice inventories 1078a-n). Each voice inventory may correspond to various segments of audio that was recorded by a speaking human, such as a voice actor, where the segments are stored in an individual inventory 1078 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1030 may then use the information about each unit to select units to be joined together to form the speech output.

The unit selection engine 1030 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1020) to form output audio data 1090 representing synthesized speech. Using all the information in the unit database, a unit selection engine 1030 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1020) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1072 based on feedback of the results of TTS processing, thus enabling the TTS component 280 to improve speech synthesis.

The TTS unit storage 1072 may be customized for an individual user based on his/her individualized desired speech output. In particular, the speech unit stored in a unit database may be taken from input audio data of the user speaking. For example, to create the customized speech output of the system, the system may be configured with multiple voice inventories 1078a-1078n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1078 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1068) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1072 or in another storage component. For example, different unit selection databases may be stored in TTS unit storage 1072. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1032 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1032 may lead to a number of potential audio output sequences. Based on the acoustic model and other potential models, the potential audio output sequences may be scored according to a confidence level of the parametric synthesis engine 1032. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1068, which may represent acoustic settings matching a particular parametric "voice", may be used by the synthesis component 1020 to ultimately create the output audio data 1090.

When performing unit selection, after a unit is selected by the unit selection engine 1030, the audio data corresponding to the unit may be passed to the synthesis component 1020. The synthesis component 1020 may then process the audio data of the unit to create modified audio data where the modified audio data reflects a desired audio quality. The synthesis component 1020 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 280. For each unit that corresponds to the selected portion, the synthesis component 1020 may process the audio data for that unit to create a modified unit audio data. The modified unit audio data may then be concatenated to form the output audio data 1090. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 280. In that case, other output data 1085 may be output along with the output audio data 1090 so that an ultimate playback device (e.g., device 110) receives instructions for playback that can assist in creating the desired output audio. Thus, the other output data 1085 may include instructions or other data indicating playback device settings (such as volume, playback rate, etc.) or other data indicating how output audio data including synthesized speech should be output. For example, for whispered speech, the output audio data 1090 may include other output data 1085 that may include a prosody tag or other indicator that instructs the device 110 to slow down the playback of the output audio data 1090, thus making the ultimate audio sound more like whispered speech, which is typically slower than normal speech. In another example, the other output data 1085 may include a volume tag that instructs the device 110 to output the speech at a volume level less than a current volume setting of the device 110, thus improving the quiet whisper effect.

Figure 11:
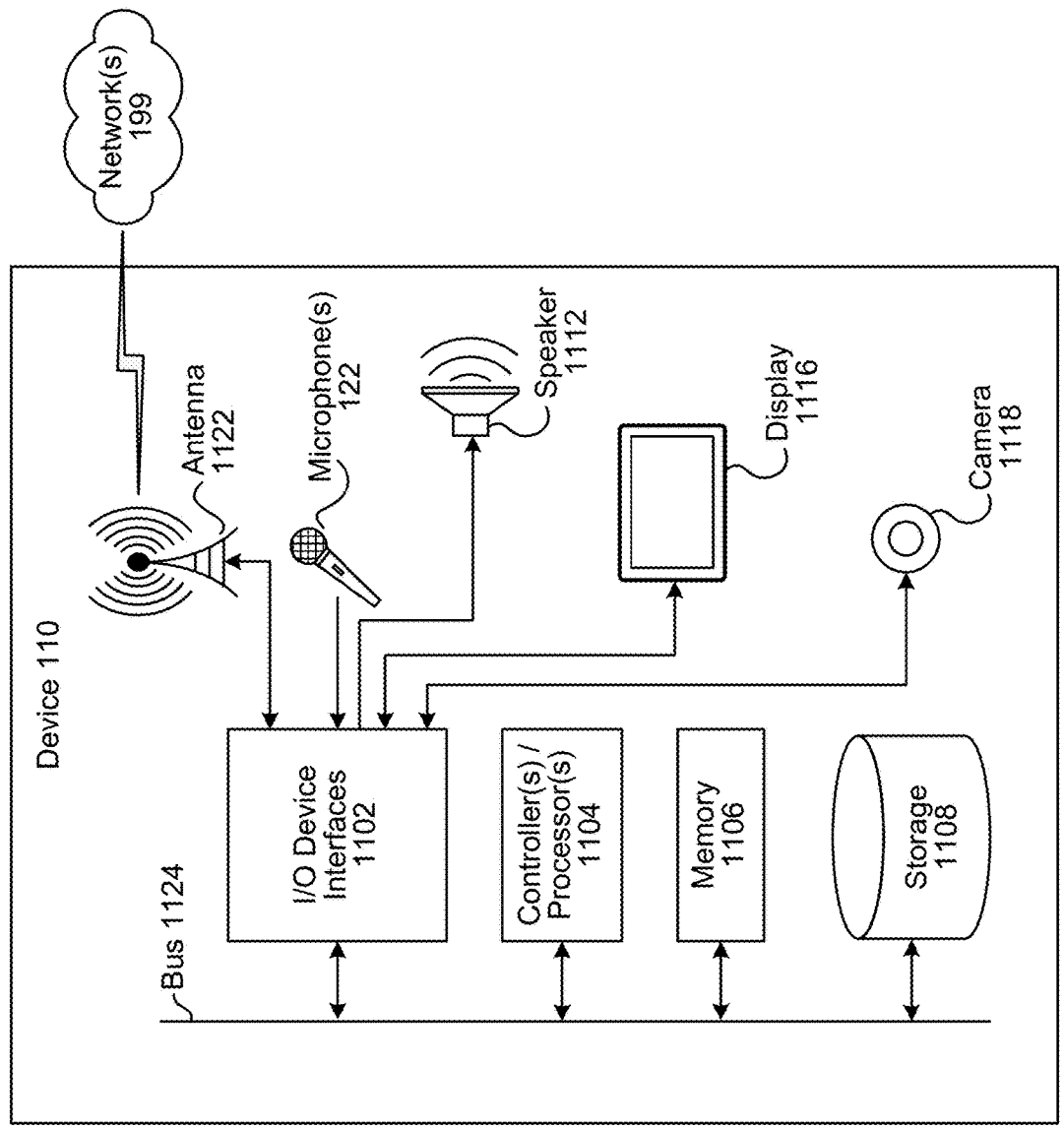
FIG. 11 is a block diagram conceptually illustrating example components of a device, according to embodiments of the present disclosure.
Figure 12:
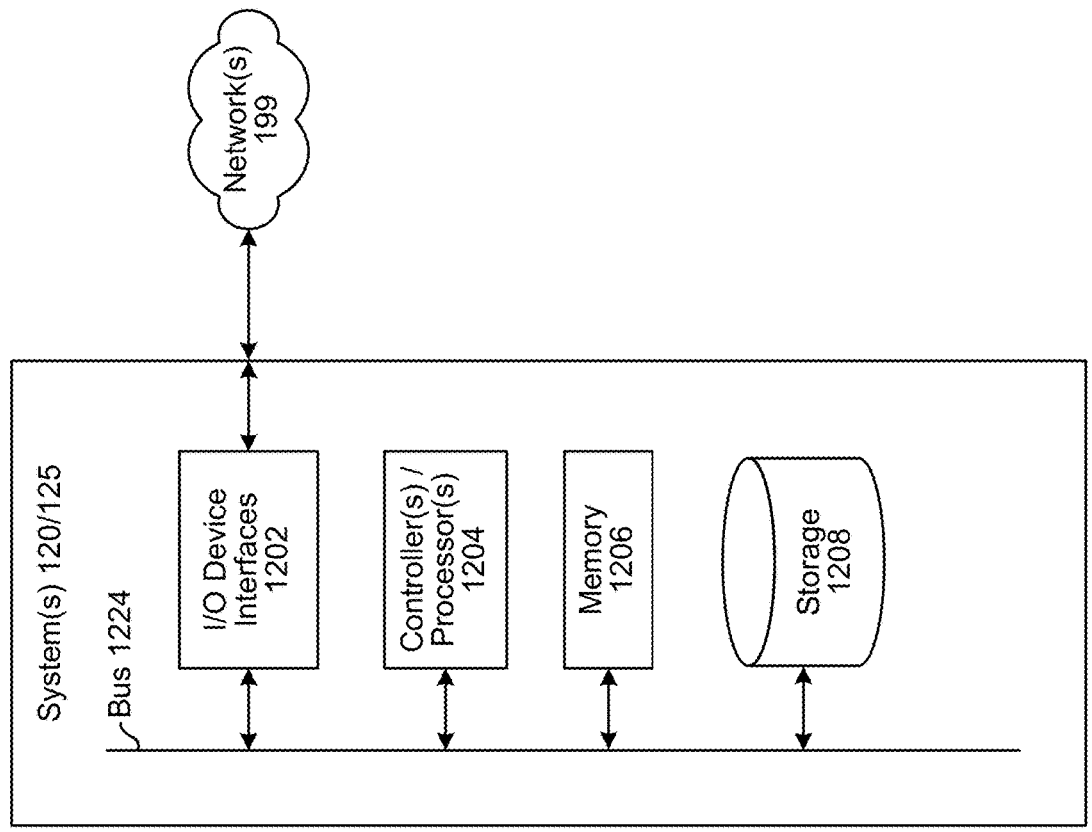
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a second device, such as the natural language command processing system 120, which may assist with ASR processing, NLU processing, etc., and a skill system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/225) may be included in the overall system 100 of the present disclosure, such as one or more natural language processing systems 120 for performing ASR processing, one or more natural language processing systems 120 for performing NLU processing, one or more skill systems 225, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/225) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1102/1202).

Computer instructions for operating each device (110/120/225) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/225) includes input/output device interfaces (1102/1202). A variety of components may be connected through the input/output device interfaces (1102/1202), as will be discussed further below. Additionally, each device (110/120/225) may include an address/data bus (1124/1224) for conveying data among components of the respective device. Each component within a device (110/120/225) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 122 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 120, or a skill system 225 may include their own dedicated processors, memory, and/or storage. Alternatively, one or more of the components of the device(s) 110, the natural language command processing system 120, or a skill system 225 may utilize the I/O interfaces (1102/1202), processor(s) (1104/1204), memory (1106/1206), and/or storage (1108/1208) of the device(s) 110, natural language command processing system 120, or the skill system 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 225, as described herein, are illustrative, and may be located as a stand-alone device or may be included, in whole or in part, as a component of a larger device or system. As can be appreciated, a number of components may exist either on a system 120 and/or on device 110. For example, language processing components 292 (which may include ASR component 250), language output components 293 (which may include NLG 279 and TTS component 280), etc., for example as illustrated in FIG. 1A. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
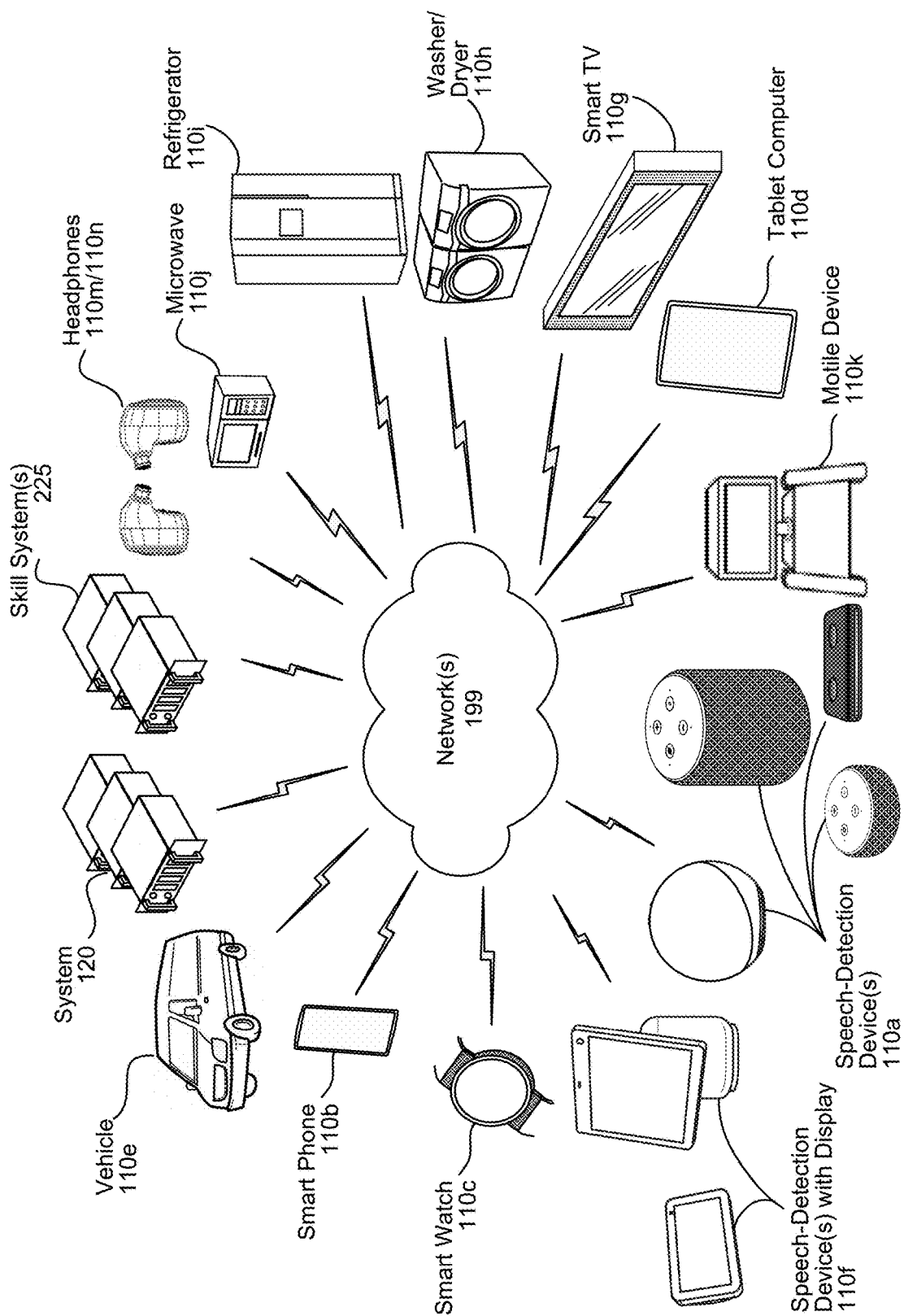
FIG. 13 illustrates an example of a computer network for use with the overall system, according to embodiments of the present disclosure.

As illustrated in FIG. 13, multiple devices (110a-110n, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving a first frame of audio data, the first frame representing log filterbank energy (LFBE) of a first portion of audio received at a first device;
processing the first frame using a first convolutional neural network (CRNN) encoder to generate first audio feature data representing the first frame, the first CRNN encoder having first weights;
processing the first audio feature data using a first neural network classifier configured to detect a presence of an acoustic event, the first neural network classifier having second weights;
processing the first audio feature data using a neural network decoder to generate a first predicted frame representing first predicted LFBE of an expected subsequent portion of audio;
receiving a second frame of audio data, the second frame of audio data representing LFBE of a second portion of audio received at the first device;
analyzing the first predicted frame and the second frame to determine third weights of a second CRNN encoder, the second CRNN encoder being the first CRNN encoder after an update;
sending, to a second device, first update data representing the third weights;
receiving, from the second device in response to the first update data, second update data representing fourth weights generated using at least the first update data and third update data received by the second device from a third device; and
determining, using the second update data, fourth weights of a third CRNN encoder, the third CRNN encoder corresponding to an update of the second CRNN encoder.

2. The method of claim 1, further comprising:
before receiving the first frame of audio data, training a third CRNN encoder and a second neural network classifier using a first dataset to determine the first weights and the second weights;
sending, to the first device, the first weights and the second weights;
processing at least the first update data and the third update data to generate aggregated update data;
determining, using the aggregated update data, fifth weights for a fourth CRNN encoder corresponding to an update of the third CRNN encoder;
processing the first dataset using the fourth CRNN encoder to determine second audio feature data;
training the second neural network classifier using the second audio feature data and the first dataset to determine sixth weights for a third neural network classifier corresponding to an update of the second neural network classifier; and
sending, to the first device, fourth update data representing the sixth weights.

3. A method comprising:
receiving a first portion of audio data;
processing, by a first device, the first portion using a first machine learning encoder to generate first audio feature data representing the first portion;
processing the first audio feature data using a first machine learning classifier;
processing the first audio feature data using a first machine learning decoder to generate a first predicted portion of audio data representing an expected subsequent portion of audio data;
receiving a second portion of audio data;
analyzing the first predicted portion and the second portion to determine first updated weights of a second machine learning encoder, the second machine learning encoder being the first machine learning encoder after a first update;
sending, to a second device, first update data representing the first updated weights;

receiving, from the second device in response to the first update data, second update data representing second updated weights generated using at least the first update data and third update data received by the second device from a third device; and generating, using the second update data, a third machine learning encoder, the third machine learning encoder being the second machine learning encoder after a second update.

4. The method of claim 3, further comprising:

before receiving the first portion of audio data, training a fourth machine learning encoder and a second machine learning classifier using a first dataset to determine first weights for the first machine learning encoder and second weights for the first machine learning classifier;

sending, to the first device, the first weights;

sending, to the first device, the second weights;

causing the first device to generate the first machine learning encoder using the first weights; and causing the first device to generate the second machine learning encoder using the second weights.

5. The method of claim 4, further comprising:

receiving at least fourth update data from the first device, the fourth update data representing a first portion of updated machine learning encoder weights;

receiving fifth update data from the third device, the fifth update data representing a second portion of updated machine learning encoder weights;

training the second machine learning classifier using the fourth update data, the fifth update data, and the first dataset to determine fifth weights for a third machine learning classifier, the third machine learning classifier being the second machine learning classifier after a third update; and sending, to the first device, sixth update data representing the fifth weights.

6. The method of claim 5, further comprising:

processing at least the fourth update data and the fifth update data to generate aggregated update data;

determining, using the aggregated update data, sixth weights for a fifth machine learning encoder, the fifth machine learning encoder being the fourth machine learning encoder after a fourth update; and processing the first dataset using the fifth machine learning encoder to determine second audio feature data, wherein training the second machine learning classifier to determine the fifth weights is additionally based on the second audio feature data.

7. The method of claim 3, further comprising:

analyzing the first predicted portion and the second portion to determine third updated weights of a second machine learning decoder, the second machine learning decoder being the first machine learning decoder after a third update;

sending, to the second device, third update data representing the third updated weights;

receiving, from the second device in response to the first update data, fourth update data representing fourth updated weights generated using at least the third update data and fourth update data received by the second device from the third device; and generating, using the fourth update data, a third machine learning decoder, the third machine learning decoder being the second machine learning decoder after a fourth update.

8. The method of claim 3, wherein the first portion represents first filterbank energy (LFBE) of a first frame of audio data, the second portion represents second LFBE of a second frame of audio data, the first predicted portion represents predicted LFBE for the second frame of audio data, and the method further comprises:

training the first machine learning encoder and the first machine learning decoder using the predicted LFBE and the second LFBE to determine the first updated weights.

9. The method of claim 3, further comprising:

determining, based at least on processing the first audio feature data using the first machine learning classifier, that an event has occurred; and in response to determining that an event has occurred, causing the first device to output a notification regarding the event.

10. The method of claim 3, further comprising:

determining, based at least on processing the first audio feature data using the first machine learning classifier, that an event has occurred; and in response to determining that an event has occurred, causing a fourth device different from the first device to output a notification regarding the event.

11. The method of claim 3, further comprising:

receiving, by the first device, input audio;

generating, based on the input audio, at least the first portion of audio data and the second portion of audio data; and in response to determining that an event has occurred, causing a change of physical state of a fourth device different from the first device.

12. A system, comprising:

at least one processor; and at least one memory comprising instructions that, when executed by the at least one processor, cause the system to:

receive a first portion of audio data;

process, by a first device, the first portion using a first machine learning encoder to generate first audio feature data representing the first portion;

process the first audio feature data using a first machine learning classifier;

process the first audio feature data using a first machine learning decoder to generate a first predicted portion of audio data representing an expected subsequent portion of audio data;

receive a second portion of audio data;

analyze the first predicted portion and the second portion to determine first updated weights of a second machine learning encoder, the second machine learning encoder being the first machine learning encoder after a first update;

send, to a second device, first update data representing the first updated weights;

receive, from the second device in response to the first update data, second update data representing second updated weights generated using at least the first update data and third update data received by the second device from a third device; and generate, using the second update data, a third machine learning encoder, the third machine learning encoder being the second machine learning encoder after a second update.

13. The system of claim 12, wherein the at least one memory further includes instructions that, when executed by the at least one processor, further cause the system to:

before receiving the first portion of audio data, train a fourth machine learning encoder and a second machine learning classifier using a first dataset to determine first weights for the first machine learning encoder and second weights for the first machine learning classifier;

send, to the first device, the first weights;

send, to the first device, the second weights;

cause the first device to generate the first machine learning encoder using the first weights; and cause the first device to generate the second machine learning encoder using the second weights.

14. The system of claim 13, wherein the at least one memory further includes instructions that, when executed by the at least one processor, further cause the system to:

receive at least fourth update data from the first device, the fourth update data representing a first portion of updated machine learning encoder weights;

receive fifth update data from the third device, the fifth update data representing a second portion of updated machine learning encoder weights;

train the second machine learning classifier using the fourth update data, the fifth update data, and the first dataset to determine fifth weights for a third machine learning classifier, the third machine learning classifier being the second machine learning classifier after a third update; and send, to the first device, sixth update data representing the fifth weights.

15. The system of claim 14, wherein the at least one memory further includes instructions that, when executed by the at least one processor, further cause the system to:

process at least the fourth update data and the fifth update data to generate aggregated update data;

determine, using the aggregated update data, sixth weights for a fifth machine learning encoder, the fifth machine learning encoder being the fourth machine learning encoder after a fourth update; and process the first dataset using the fifth machine learning encoder to determine second audio feature data, wherein training the second machine learning classifier to determine the fifth weights is additionally based on the second audio feature data.

16. The system of claim 12, wherein the at least one memory further includes instructions that, when executed by the at least one processor, further cause the system to:

analyze the first predicted portion and the second portion to determine third updated weights of a second machine learning decoder, the second machine learning decoder being the first machine learning decoder after a third update;

send, to the second device, third update data representing the third updated weights;

receive, from the second device in response to the first update data, fourth update data representing fourth updated weights generated using at least the third update data and fourth update data received by the second device from the third device; and generate, using the fourth update data, a third machine learning decoder, the third machine learning decoder being the second machine learning decoder after a fourth update.

17. The system of claim 12, wherein the first portion represents first filterbank energy (LFBE) of a first frame of audio data, the second portion represents second LFBE of a second frame of audio data, the first predicted portion represents predicted LFBE for the second frame of audio data, the at least one memory further includes instructions that, when executed by the at least one processor, further cause the system to:

train the first machine learning encoder and the first machine learning decoder using the predicted LFBE and the second LFBE to determine the first updated weights.

18. The system of claim 12, wherein the at least one memory further includes instructions that, when executed by the at least one processor, further cause the system to:

determine, based at least on processing the first audio feature data using the first machine learning classifier, that an event has occurred; and in response to determining that an event has occurred, cause the first device to output a notification regarding the event.

19. The system of claim 12, wherein the at least one memory further includes instructions that, when executed by the at least one processor, further cause the system to:

determine, based at least on processing the first audio feature data using the first machine learning classifier, that an event has occurred; and in response to determining that an event has occurred, cause a fourth device different from the first device to output a notification regarding the event.

20. The system of claim 12, wherein the at least one memory further includes instructions that, when executed by the at least one processor, further cause the system to:

receive, by the first device, input audio;

generate, based on the input audio, at least the first portion of audio data and the second portion of audio data; and in response to determining that an event has occurred, cause a change of physical state of a fourth device different from the first device.

* * * * *